United States Patent [19]
Vassiliou

[11] Patent Number: 5,711,805
[45] Date of Patent: Jan. 27, 1998

[54] APPARATUS FOR MAKING AND COATING EGG YOLKS AND OTHER ARTICLES

[76] Inventor: Eustathios Vassiliou, 12 S. Townview La., Newark, Del. 19711

[21] Appl. No.: 689,503

[22] Filed: Aug. 13, 1996

Related U.S. Application Data

[63] Continuation of Ser. No. 403,424, Mar. 14, 1995, Pat. No. 5,589,208.

[51] Int. Cl.$^6$ ........................................... A23G 3/00
[52] U.S. Cl. .................... 118/13; 118/20; 118/24; 118/30; 118/31; 118/300; 118/DIG. 4; 427/420; 427/421
[58] Field of Search .................. 118/13, 20, 24, 118/30, 31, 300, DIG. 4; 427/420, 421, 337, 339, 341; 426/276, 575, 104

[56] References Cited

U.S. PATENT DOCUMENTS

| | | |
|---|---|---|
| 895,092 | 8/1908 | Kirby . |
| 2,660,305 | 11/1953 | Labouygues .............................. 209/155 |
| 3,269,297 | 8/1966 | Hilgeland .................................. 99/234 |
| 3,494,475 | 2/1970 | Hedstrom et al. ......................... 210/521 |
| 3,650,766 | 3/1972 | Smadar ....................................... 99/100 |
| 3,804,951 | 4/1974 | Rapp ........................................ 426/167 |
| 4,141,287 | 2/1979 | Becker et al. .......................... 99/450.1 |
| 4,251,547 | 2/1981 | Liggett ........................................ 426/1 |
| 4,409,249 | 10/1983 | Forkuer .................................... 426/100 |
| 4,624,856 | 11/1986 | Vanderveer et al. .................... 426/549 |
| 5,073,399 | 12/1991 | Vassiliou ................................. 426/614 |
| 5,149,561 | 9/1992 | Vassiliou ................................. 426/614 |
| 5,151,293 | 9/1992 | Vassiliou ................................. 426/614 |
| 5,192,566 | 3/1993 | Cox et al. ................................... 428/89 |
| 5,227,189 | 7/1993 | Vassiliou ................................. 426/614 |
| 5,340,601 | 8/1994 | Vassiliou ................................. 426/614 |
| 5,401,525 | 3/1995 | Vassiliou ................................. 426/614 |
| 5,567,238 | 10/1996 | Long, Jr. et al. .......................... 118/13 |

*Primary Examiner*—Laura Edwards
*Attorney, Agent, or Firm*—E. Vassiliou

[57] ABSTRACT

Methods and apparatuses are disclosed for coating egg-yolk disks containing egg-yolk materials. The egg-yolk is initially produced in the form of a cylinder, which is cut into disks, which disks after being encapsulated into an edible membrane, are used in combination with egg-white to form egg-products which may be fried or poached in a similar manner as real eggs. The methods and apparatuses of the present invention are useful for coating articles other than egg yolk disks.

11 Claims, 13 Drawing Sheets

APPARATUS FOR MAKING AND COATING EGG YOLKS AND OTHER ARTICLES

This is a Division of application Ser. No. 08/403,424 filed on Mar. 14, 1995, now U.S. Pat. No. 5,589,208.

FIELD OF THE INVENTION

This invention relates to methods and apparatuses for making, cutting into disks, and coating articles and especially artificial egg-yolk disks with a restrictive barrier or membrane.

BACKGROUND OF THE INVENTION

Although eggs represent an outstanding nutritional food which is enjoyed by many people, especially as part of one's breakfast, the fact is that natural egg yolk is one of the richest foods in cholesterol. This has forced a large number of people who are on cholesterol and fat free diets from enjoying eating natural whole eggs. One practical and economically feasible solution has been to incorporate a simulated and preferably a cholesterol free egg yolk into natural egg white and to preserve them in separate phases, so that one can make, for example, a "sunny side up" and "over easy" egg. In this regard, there is known in the inventor's U.S. Pat. No. 5,073,399, which is incorporated by reference herein, a simulated egg yolk and simulated raw whole egg manufactured therewith constituting an edible liquid, a viscosity modifier which is preferably a positive thermoreversible gel former, and a colorant. The simulated egg yolks produced thereby, which may be encapsulated by a hydrocolloid restrictive barrier, are remarkably lifelike and are useful in the preparation of "sunny side up" and "over easy" eggs when disposed in natural egg whites.

The inventor realized that in the preparation of a simulated whole raw egg for use in the production of a natural looking "sunny side up" or "over easy" egg, it is typically necessary to store the simulated egg yolk in a separate gelled phase within liquid natural egg white. It was observed that these simulated egg yolks tend to absorb water from the natural egg White, probably by osmosis, thereby undesirably increasing the weight and volume of the egg yolk. The absorption of water is undesirable because it decreases the viscosity of the egg yolk upon cooking, which adversely results in the reduction of the egg yolk's overall mechanical and/or physical strength, i.e., the ability to remain unbroken and to retain its integrity and shape prior to being purposefully broken after cooking when being eaten. The decrease in viscosity can result in the premature disruption of the structure of the discrete egg yolk when in the molten state, such as during cooking, and uncontrolled running of the egg yolk at serving temperatures may take place. In addition, the reduction in the egg yolk's mechanical and/or physical strength requires that the egg yolk be handled delicately.

In the inventor's U.S. Pat. No. 5,151,293, which is also hereby incorporated by reference, a number of possible remedies to overcome these problems of water absorption were proposed. It was observed that the positive thermoreversible gel former used in the production of the simulated egg yolk appeared to be the driving force behind the absorption of water from natural egg white. Although it was proposed to minimize the amount of gel former used, this also had the tendency of producing "delicate" egg yolks whose viscosity will change prematurely such that the egg yolk's monolithic structure is lost during manufacturing and/or handling, including during cooking. Thus, the proposed solution created other problems which were not fully resolved.

Another proposed method of reducing the initial weight gain of a simulated egg yolk, yet maintaining its viscosity and mechanical and/or physical strength, is by the use of a restrictive barrier. Several methods of imparting such a barrier to the egg yolk before being added to liquid natural egg white are described, such as a cross-linked membrane of an edible resin, e.g. an alginate, a pectin, and the like. A multivalent cation, such as calcium or aluminum in the form of a salt may be used as the cross-linking agent. A restrictive barrier can also be formed from hydrateable edible polymeric compounds or hydrocolloids which give rise to substantial instantaneous increase in viscosity as soon as they come into contact with and start dissolving in aqueous systems.

Also disclosed is reducing the absorption of water by adding a solute to the liquid egg white such that smaller osmotic pressure differential will exist between the liquid egg white and the simulated egg yolk. This is expected to minimize the force thought to be driving water into the egg yolk. Finally, the inventor proposed immersing the egg yolk in an aqueous medium which provides an accelerated tendency of the egg yolk to absorb water. In this technique, the egg yolk is formulated with less water than would otherwise be used. The egg yolk is then immersed into water until the degree of water absorption desirable has been achieved. When added to liquid egg white, the thus created egg yolk does not exhibit a strong tendency to further absorb water.

Although the '293 patent mentions forming a restrictive barrier layer from a cross-linked film of an edible resin, there is no reference to a particular method of forming the barrier around an egg yolk. The methods used so far to produce restrictive barriers around simulated egg yolks were both time consuming and cumbersome. For example, Forkner, U.S. Pat. No. 4,409,249, discusses briefly the use of cross-linked hydrocolloids, such as alginates, with calcium salts, as edible membranes around artificial liquid yolks to hold the shape of the egg yolk. Cox et al., U.S. Pat. No. 5,192,566, discloses various detailed methods of forming a restrictive barrier around a simulated liquid egg yolk. In both Forkner and Cox et al. frozen or otherwise immobilized liquid egg yolk is coated with a restrictive barrier forming solution or dispersion such as one containing edible hydrocolloids, for example, sodium alginate. The coated egg yolk is treated to form the restrictive barrier by contact with a reactive composition in the form of a setting bath containing a setting agent, for example, calcium chloride. Cox et al. discusses two alternative methods, the first of which they co-extrude a central yolk portion with a surrounding portion containing the film former, and in the second they include the film former in the formulation of the yolk. In the preferred method of Cox et al., the second method, the restrictive barrier forming compounds are mixed with the egg yolk components in sufficient quantities to form a barrier on the outer surface of the egg yolk when contacted with a setting agent. The liquid egg yolk is extruded in the form of discrete liquid globules into a setting bath. These methods are undesirably time consuming, requiring the yolks to stay in the setting bath for 8–15 minutes, followed by rinsing for about 10–20 minutes.

This conventional process of forming a restrictive barrier in accordance with either Cox et al. or Forkner was found to present a large number of disadvantages resulting in a simulated egg yolk having a poorly formed barrier. A major drawback is the commercially undesirable (which may come to the point of being unacceptable) length of time needed to complete the process. When attempting to use reasonably short times for the conventional process, additional drawbacks, just to mention a few, include, but are not limited to, irreproducibility of the quality of the membrane, thickness variability, openings in the membrane structure, weak regions which may break easily, and tough to chew regions making the consumption of the respective egg unpleasant.

More particularly, the coating of the egg yolk first with a restrictive barrier forming compound often results in a barrier which is not only flimsy, but also not uniform in thickness. When immersed in the setting bath, the restrictive barrier forming compound often does not cross-link uniformly, in particular, in those regions having a thicker layer, thereby requiring extended residence times. In addition, it has been found that in those regions where an excess of restrictive barrier forming compound is present, incomplete cross-linking may still occur, resulting in the barrier layer being relatively weak, and in fact, may be in the nature of a loose slurry. These regions are potential defect sites which can cause the simulated egg yolk to prematurely rupture during handling.

The setting bath which contains the setting agent, for example, calcium chloride being the major representative of setting agent, even at small concentrations is known to have a bitter taste. Any excess setting agent which is retained on the egg yolk will subsequently dissolve in the liquid egg whites into which the egg yolk is deposited. This will result in the finally cooked whole egg having a bitter unpleasant taste which is unacceptable to the consumer. To avoid this problem, it becomes necessary to subsequently subject the egg yolk to an extensive rinse bath which is highly undesirable from the standpoint of both process time and economy.

A further disadvantage is the high probability of a remaining slippery fluid region under the membrane and surrounding the solid at room temperature yolk portion, which fluid region consists of unset or incompletely set film former. All these disadvantages render these processes very delicate, sensitive to unforeseen external parameters, time Consuming, and cumbersome. Still more particularly, according to the conventional method, the yolk is dipped into a solution of a film former, which is very viscous even at low concentrations of film former, and therefore it produces an uneven thick film on the yolk. When this film comes in contact with the solution of the setting agent, a thin cross-linked skin is formed at the top of the film, away from the yolk. The skin does not allow easy access to the rest of the trapped film former, and thus, one has to wait for a long time (many minutes) for the setting agent, for example calcium ions, to diffuse through the skin and continue setting the rest of the resin. This increases the thickness of the skin and makes the diffusion process more and more difficult. If one does not wait for all the time required to complete the setting throughout the thickness of the film, there will remain a slippery fluid region under the skin, adjacent to the yolk, rendering the thus far made membrane flimsy and not supported by the non-flowable yolk. Further, since the outermost skin of the membrane will be fully cross-linked, due to the abundance of setting agent in that region, its adhesion to the white will be minimal, if any at all, upon cooking the yolk and coagulating the white. It is a very well known fact that fully cross-linked surfaces are notorious for refusing to adhere to other surfaces, and they may even be used as release structures. Thus, special treatment will be needed to provide adhesion of the membrane to the white.

Since the environment at which the membrane was formed in this case includes an abundance of setting agent, thorough rinsing becomes necessary in order to remove the setting agent (calcium chloride, for example) before the processed yolk is introduced into the egg white. The task of removing the setting agent becomes even more difficult, due to the fact that the portion of setting agent which has been trapped within the fully cross-linked outer part of the membrane, and which travels outward at a very low speed, does not find any uncross-linked sites to be bound, and therefore it has to be substantially removed completely to avoid the undesirable taste and other ailments that may introduce to the white.

Neither of the aforementioned patents provide a commercially feasible method of manufacturing large quantities of high quality simulated egg yolk and "friable" (either "sunny side up" or "over easy") or "poachable" whole eggs. In the case of U.S. Pat. No. 5,151,293, the problems of commercializable methods are complicated by attempting to balance the complexities of water absorption and the need for a strong, monolithic simulated egg yolk with a highly controlled temperature/viscosity profile (yolk formulated to only become runny and lose its shape when desired).

These problems were solved in Applicant's co-pending application Ser. No. 08/075,106 filed Jun. 11, 1993 which is also incorporated herein by reference, by the provision of a commercially feasible mass production method for the formation of high quality simulated egg yolk which is extrudable at or below room temperature in accordance with the present invention. The resulting simulated egg yolk, when added to liquid natural egg white and, thereafter, fried, yields a realistic egg in flavor, texture and look. The resulting egg retains a discrete egg yolk, even at serving temperatures, which naturally runs upon being disturbed. Thus, the resulting egg product looks, tastes and behaves as a natural fried or poached egg. Applicant discloses in U.S. Pat. No. 5,401,525, issued on Mar. 28, 1995, which is incorporated herein by reference, an apparatus and method of performing coating of the yolks. However, the disclosed method of coating yolk disks involves many moving pads, which add complexity.

SUMMARY OF THE INVENTION

This invention relates to methods and apparatuses for making and coating artificial egg-yolk disks or other articles with a restrictive barrier or membrane, as well as eggs containing the coated egg-yolks. Three of the most important stations to achieve this are (a) a yolk cylinder station, wherein the raw material are mixed, processed, and extruded into a form of a cylinder, (b) a disk cutting station, wherein the yolk cylinder is cut into disks, as it is being extruded, and (c) a coating station, wherein the disks are encapsulated in a membrane, preferably made of an alginate cross linked with a multivalent ion, such as calcium, magnesium, and aluminum, for example.

Regarding the yolk cylinder station, this invention relates to a method of making artificial egg-yolk comprising the steps of:
(a) mixing artificial egg-yolk materials including a positive thermoreversible gel former to form a first mixture, the positive thermoreversible gel former providing a gel temperature to the artificial egg-yolk;
(b) heating the first mixture to a first temperature higher than 140° F.;
(c) mixing a first quantity of the first mixture with a second quantity of a liquid having a second temperature and comprising egg-white to form a second mixture having a third temperature, the first and second quantities and the first and second temperatures being such that the third temperature is higher than the gel temperature but lower than a temperature at which the egg-white coagulates.

It is preferable that the first temperature is in the range of 150°–190° F., the second temperature is in the range of 32° to 60° F., and that the third temperature is in the range of 100° to 130° F.

It is also preferred that the mixing of the first mixture with the liquid is performed in a static mixer.

This method may also comprise a step of holding part of the second mixture in a controlled volume vessel at a temperature higher than the gel temperature, and an additional step of further cooling the second mixture to a temperature under the gel temperature in a manner to gel thermoreversibly said second mixture. The method may also comprise a step of extruding the thermoreversibly gelled second mixture through a die in the form of a cylinder which may be cut into disks. The die may be selected from the group consisting of a single branched die and a multi-branched die comprising equidistant branches.

This invention also relates to a device for making artificial egg-yolk comprising:
   a first vessel for holding a first mixture of artificial egg-yolk materials at a first temperature higher than 140° F., the egg-yolk materials comprising a positive thermoreversible gel former, the positive thermoreversible gel former providing a gel temperature to the artificial egg-yolk;
   a second vessel for holding a liquid comprising egg-white at a second temperature;
   a first pump connected to the first vessel and a second pump connected to the second vessel,
      the first and second pumps being adapted to bring together a first quantity of the first mixture with a second quantity of the liquid to form a second mixture having a third temperature, the quantities and temperatures of the first mixture and the liquid being such that the third temperature is higher than the gel temperature but lower than a temperature at which the egg-white coagulates.

As aforementioned, the first temperature is preferably in the range of 150°–190° F., the second temperature is in the range of 32° to 60° F. and the third temperature is in the range of 100° to 130° F.

The device may comprise a static mixer at a point after the first quantity of the first mixture and the second quantity of the liquid are brought together to form the second mixture, in order to ensure intimate mixing between said first mixture and liquid. It may further comprise a controlled volume vessel at a point after the first quantity of the first mixture and the second quantity of the liquid are brought together to form the second mixture, adapted to hold a controlled amount of said second mixture at a temperature higher than the gel temperature. Preferably, the controlled volume vessel further comprises a level switch which is adapted to deactivate the first and second pumps when the second mixture exceeds a predetermined high level, and reactivate the first and second pumps when the second mixture goes under a low predetermined level.

The device may also comprise a cooler having a front end and a back end, the cooler being adapted to cool the second mixture to a temperature under the gel temperature in a manner to gel thermoreversibly said second mixture. It may further comprise a third pump between the controlled volume vessel and the cooler, adapted to advance the second mixture from the controlled volume vessel to and through the cooler from the front end toward the back end at a predetermined rate.

It may also comprise a die connected to the back end of the cooler, which die may be selected from the group consisting of a single branched die and a multi-branched die comprising equidistant branches.

Regarding the disk cutting station, this invention pertains to a Regarding the yolk cylinder station, this invention relates to a cutting device for forming egg-yolk disks comprising in combination:
   an assembly of a cutting wire and a frame supporting the cutting wire, the cutting wire being adapted to follow a cutting path, the cutting path having a first direction; and
   an extrusion array comprising
      a main cylinder having a front end with a first set of threads; and
      an extrusion head having a front surface and a second set of threads commensurate to the first set of threads of the main cylinder, in a manner that the extrusion head may be threaded on the main cylinder to a desired degree in order to attain a desired position, wherein the front surface substantially coincides with the cutting path of the cutting wire, so that when the cutting wire follows the cutting path, said cutting wire slides on the front surface of the extrusion head.

The cutting device for forming egg-yolk disks of the instant invention may also comprise in combination:
   an assembly of a cutting wire and a frame supporting the cutting wire, the cutting wire being adapted to follow a cutting path, the cutting path having a first direction;
   an extrusion die having a front surface substantially coinciding with the cutting path of the cutting wire, so that when the cutting wire follows the cutting path, said cutting wire slides on the front surface of the extrusion die.

It is preferable that the extrusion head has rounded edges in order to ignore accidental misalignment of the front surface with respect to the cutting path. It is also preferable that it comprises a mechanism adapted to lock the extrusion head in position, which locking mechanism more preferably comprises a nut having a third set of threads commensurate to the first set of threads.

The diameter of the wire is preferably between $1/64"$ and $3/32"$, and the device preferably comprises a liquid dispenser for providing wetting liquid to wet the cutting wire.

It is further preferable that
   the frame has a low point and a high point
   the cutting wire extends from the low point to the high point in a second direction deviating from horizontal,
   the first direction of the cutting path is substantially vertical, and
   the liquid dispenser is adapted to provide the wetting liquid at the high point so that the wetting liquid runs downhill on the cutting wire, thereby wetting the cutting wire.

The liquid dispenser may also provide wetting liquid on top of the extrusion array to wet the cutting wire as the cutting wire starts cutting extruded yolk. The liquid dispenser may also provide wetting liquid to the cutting wire by spraying. The cutting wire itself may play the role of the liquid dispenser by being porous and adapted to exude wetting liquid through pores.

The disk coating station of the instant invention pertains to a method of encapsulating an article with a restrictive barrier comprising the steps of:
   (a) contacting the article with an excess of a first liquid containing a first reactant;

(b) separating the article from the excess of the first liquid;

(c) subsequently treating the wetted article with an excess of a second liquid containing a second reactant, which second reactant reacts with the first reactant to form the restrictive barrier; and (d) separating the treated article from the second liquid; with the requirement that at least one of the separating steps (b) and (d) is performed in the absence of mechanically moving parts.

It is preferable that both of the separating steps are performed in the absence of mechanically moving parts.

It is also preferable that the first reactant comprises a cross-linker, and the second reactant comprises a cross-linkable polymer, and the article is a yolk disk. It is further preferable that the cross-linker comprises a multivalent ion selected from a group consisting of calcium, magnesium, aluminum, and a mixture thereof, and the cross-linkable polymer comprises an alginate.

It is preferred that at least one of the separating steps (b) and (d) further comprises at least one step of sliding the wetted or treated article on a sliding plate, the sliding plate having a lower curvature and a direction, in a manner that said article follows a first path away from the curvature in an initial direction substantially parallel to the direction of the sliding plate, while at least part of the liquid follows a second path at least partially coinciding with the curvature. It is also preferred that the sliding plate has a first surface tension and an inclination, and the liquid has a second surface tension, the first surface tension being higher than the second surface tension thereby causing the liquid to follow the second path, and wherein the inclination is adequately high to cause the article to follow the first path.

It is further preferred that at least one of the separating steps (b) and (d) further comprises a step of blowing a gas on the sliding article.

At least one of steps (a) and (c) may comprise a step of wetting the article with the liquid, the liquid being at least partially in a form selected from a group consisting of (i) a stream moving in a substantially upward direction, (ii) a stream moving in a substantially horizontal direction, (iii) a turbulent stream with an inclined flow direction, and (iv) a liquid curtain.

In a preferable combination:

step (a) comprises a sub-step of passing the article through a curtain of the first liquid in a manner to be wetted by the first liquid;

steps (b) and (d) each comprises at least one sub-step of sliding the wetted article on a sliding plate, the sliding plate having a lower curvature and a direction, in a manner that said article follows a first path away from the curvature in an initial direction substantially parallel to the direction of the sliding plate, while at least part of the liquid follows a second path at least partially coinciding with the curvature;

step (b) also comprises a sub-step of blowing a gas on the sliding article;

step (c) comprises a sub-step of disposing the article into a stream of the second liquid moving in a substantially horizontal direction and a sub-step of passing the article through a curtain of the second liquid; and preferably step (d) further comprises a sub-step of blowing a gas on the sliding article.

The methods of this invention may further comprise subsequent steps of (e) disposing the article into a stream of rinsing water moving in a substantially horizontal direction and a sub-step of passing the article through a curtain of the rinsing water; and (f) sliding the rinsed article on a sliding plate, the sliding plate having a lower curvature and a direction, in a manner that said article follows a first path away from the curvature in an initial direction substantially parallel to the direction of the sliding plate, while at least part of the water follows a second path at least partially coinciding with the curvature.

This invention also pertains to a method of separating an article, preferably a yolk disk, wetted with a liquid from an excess of the liquid, the method comprising a step of sliding the wetted article on a sliding plate, the sliding plate having a lower curvature and a direction, in a manner that said article follows a first path away from the curvature in an initial direction substantially parallel to the direction of the sliding plate, while at least part of the liquid follows a second path at least partially coinciding with the curvature, wherein preferably the sliding plate has a first surface tension and an inclination, and the liquid has a second surface tension, the first surface tension being higher than the second surface tension thereby causing the liquid to follow the second path, and wherein the inclination is adequately high to cause the article to follow the first path.

The coating station of this invention also pertains to an apparatus for encapsulating an article, preferably a yolk disk, with a restrictive barrier comprising:

(a) a first liquid wetting station adapted to contact the article with an excess of a first liquid containing a first reactant;

(b) a first separator adapted to separate the article from the excess of the first liquid;

(c) a second liquid wetting station adapted to treat the wetted article with an excess of a second liquid containing a second reactant, which second reactant reacts with the first reactant to form the restrictive barrier; and (d) a second separator adapted to separate the treated article from the second liquid.;

with the requirement that at least one of the first and second separators is free of mechanically moving parts.

Preferably:

both the first and second separators are free of mechanically moving parts, the first reactant comprises a cross-linker, and the second reactant comprises a cross-linkable polymer, the cross-linker comprises a multivalent ion selected from a group consisting of calcium, magnesium, aluminum, and a mixture thereof, and the cross-linkable polymer comprises an alginate.

Preferably, at least one of the first and second separators further comprises at least one sliding plate, the sliding plate having a lower curvature and a direction, in a manner that said article, when disposed on the sliding plate, follows a first path away from the curvature in an initial direction substantially parallel to the direction of the sliding plate, while at least part of the liquid follows a second path at least partially coinciding with the curvature. More preferably, the sliding plate has a first surface tension and an inclination, and the liquid has a second surface tension, the first surface tension being higher than the second surface tension thereby causing the liquid to follow the second path, and wherein the inclination is adequately high to cause the article to follow the first path. Also, preferably, at least one of the separators (b) and (d) further comprises a gas blower for blowing gas on the article.

Further, it is preferable that at least one of the first and second liquid wetting stations (a) and (c) comprises a liquid dispenser adaptable to provide the respective liquid at least partially in a form selected from a group consisting of (i) a stream moving in a substantially upward direction, (ii) a stream moving in a substantially horizontal direction, (iii) a turbulent stream with an inclined flow direction, and (iv) a liquid curtain. It is more preferable that at least one of the first and second liquid wetting stations (a) and (c) further comprises a liquid curtain generator.

In a different preferred assembly:
 the first wetting station (a) comprises a first liquid curtain generator for producing a curtain of the first liquid in order to wet the article;
 the first and second separators, each comprises at least one sliding plate, the sliding plate having a lower curvature and a direction, in a manner that said article follows a first path away from the curvature in an initial direction substantially parallel to the direction of the sliding plate, while at least part of the liquid follows a second path at least partially coinciding with the curvature;
 the first separator further comprises a first gas blower for blowing a gas on the article; and
 the second wetting station comprises
  a liquid dispenser adaptable to provide the second liquid in a form of a stream moving in a substantially horizontal direction for wetting the article, and
  a liquid curtain generator positioned in a manner to wet any part of the article that might accidently escape wetting from the liquid stream.

The above assembly may further comprise:
(e) a rinsing station comprising
 a water dispenser adaptable to provide water at least partially in a form selected from a in a form selected from a group consisting of (i) a stream moving in a substantially upward direction, (ii) a stream moving in a substantially horizontal direction, (iii) a turbulent stream with an inclined flow direction, for rinsing the article, and
 a water curtain generator positioned in a manner to rinse any part of the article that might accidently escape rinsing from the liquid stream; and
(f) a water separator adaptable to separate the water from the article, comprising a sliding plate, the sliding plate having a lower curvature and a direction, in a manner that said article follows a first path away from the curvature in an initial direction substantially parallel to the direction of the sliding plate, while at least part of the water follows a second path at least partially coinciding with the curvature.

This invention also pertains an apparatus of separating an article wetted with a liquid from an excess of the liquid, the device comprising a step of sliding the wetted article on a sliding plate, the sliding plate having a lower curvature and a direction, in a manner that said article follows a first path away from the curvature in an initial direction substantially parallel to the direction of the sliding plate, while at least part of the water follows a second path at least partially coinciding with the curvature. Preferably, the sliding plate has a first surface tension and an inclination, and the rinsing water has a second surface tension, the first surface tension being higher than the second surface tension thereby causing the water to follow the second path, and wherein the inclination is adequately high to cause the article to follow the first path.

BRIEF DESCRIPTION OF THE DRAWING

The reader's understanding of this invention will be enhanced by reference to the following detailed description taken in combination with the drawing figures, wherein.

DETAILED DESCRIPTION OF THE INVENTION

As aforementioned, this invention relates to methods and apparatuses for making and coating artificial egg-yolk disks or other articles with a restrictive barrier or membrane, as well as eggs containing the coated egg-yolks.

Figure 1:
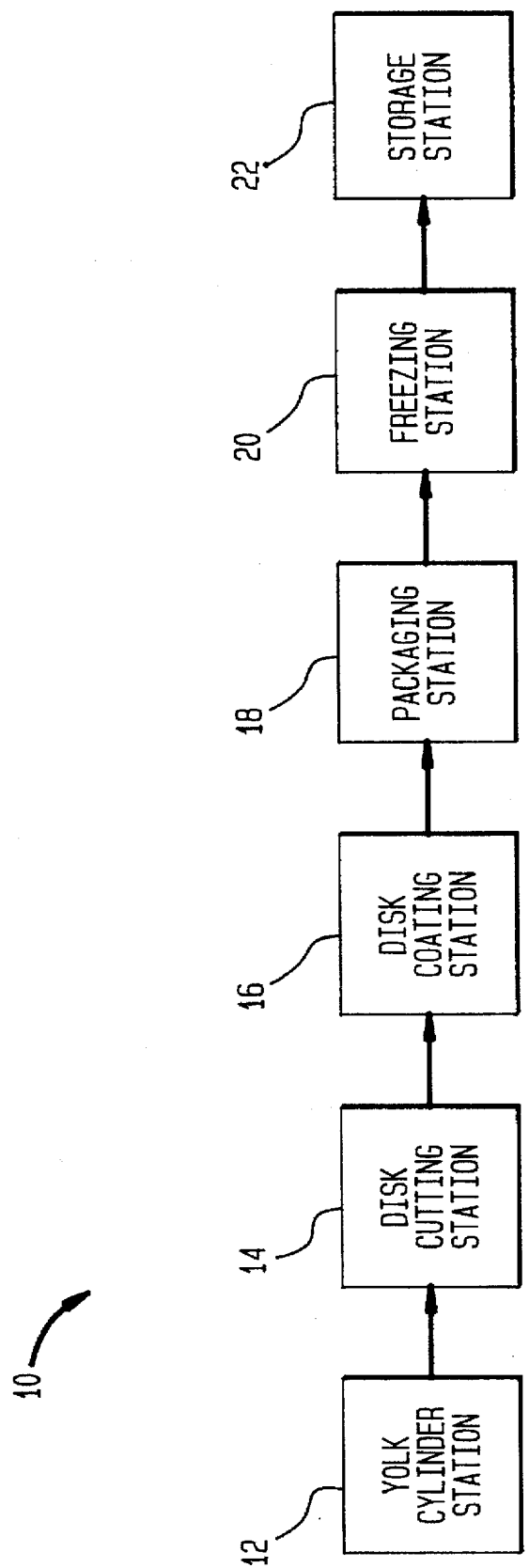
FIG. 1 illustrates in a block diagram the miscellaneous stations required for making, packaging and storing artificial yolks and eggs according to the present invention.

Referring now to FIG. 1, there is depicted a block diagram illustrating an assembly 10 of miscellaneous operating stations preferably used for the production of egg-yolks and eggs according to this invention.

In a "Yolk Cylinder Station" 12, different raw materials are mixed and treated, as it will be described in detail hereinbelow, to produce, preferably by extrusion, a continuous cylinder of egg-yolk having a desired diameter, preferably between 1.25 and 2 inches. As the cylinder comes out of a die, it is cut into disks in a "Disk Cutting Station" 14, having a thickness of preferably ⅛ to ½ inch, and more preferably ¼ to ⅜ inch. As the disks are cut, they are disposed in a "Disk Coating Station" 16, where they are coated with a restrictive barrier or membrane, preferably comprising an alginate, which more preferably is cross-linked with calcium ions. The coated yolk disks are then directed to a "Packaging Station" 18, where they are added along with an appropriate amount of egg-white into containers, preferably in individual portions of one or two yolks per container with the respective white. The weight ratio of egg-yolk to egg-white is preferably the same as in real eggs, or about 1:3 to 1:5. In sequence, the packaged eggs may be frozen by passing through a "Freezing Station" 20 or placed directly for storage in a "Storage Station" or "Storage Freezer" 22. If the "Freezing Station" is omitted, the eggs are frozen in situ in the storage freezer 22.

Figure 2:
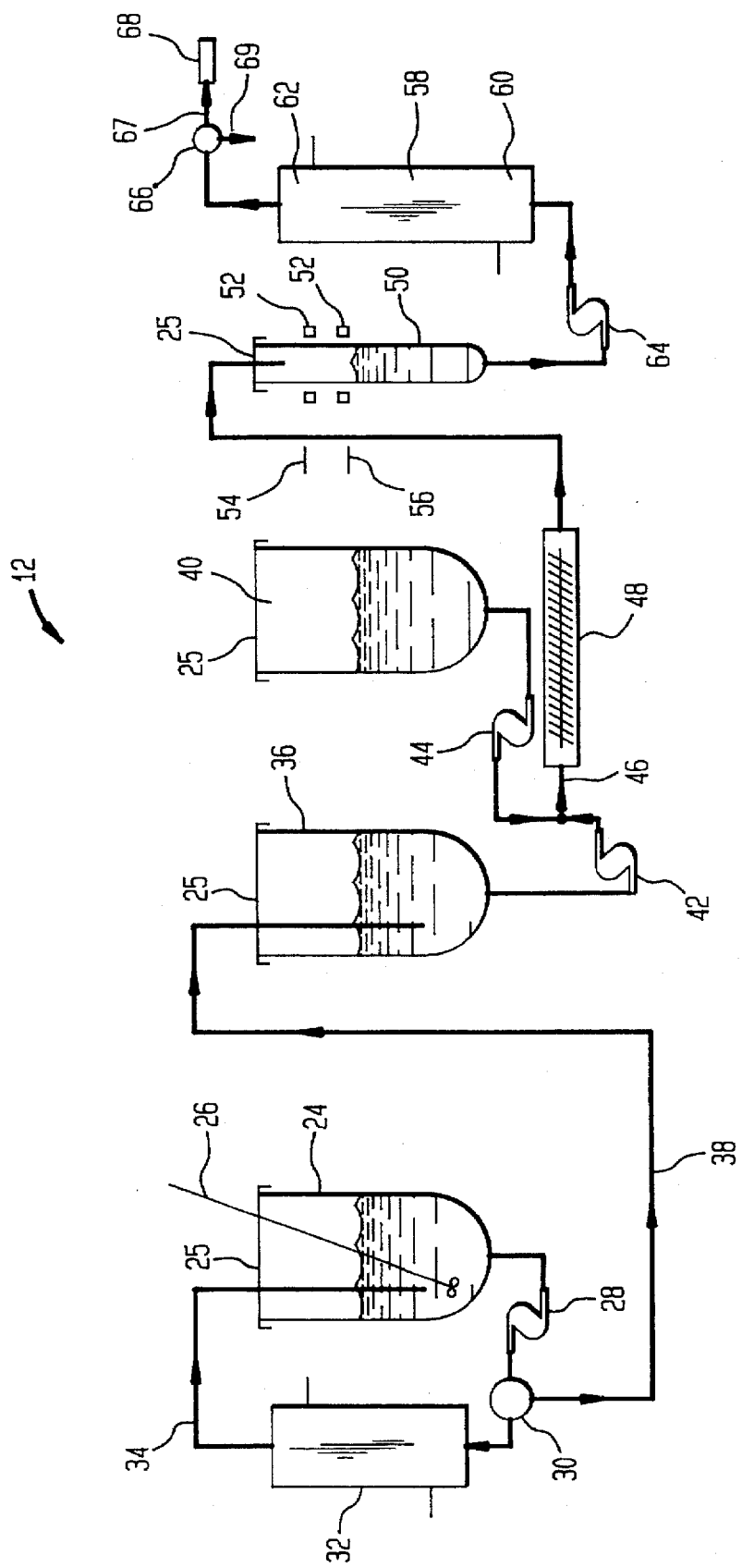
FIG. 2 illustrates a preferred yolk cylinder station according to the present invention.

In a preferred embodiment of the instant invention, the coating station 12 comprises mixing vessel 24 preferably provided with a mixer 26, as better shown in FIG. 2. The mixing vessel 24 is connected to a circulation pump 28, which circulation pump communicates in turn with a first valve 30. The first valve 30 is adapted to open communication at will, either between the circulating pump 28 and a first heat exchanger 32, which in turn communicates through line 34 with the mixing vessel 24, or between the circulating pump 28 and a first holding vessel 36 through line 38.

The heat exchanger 32 is preferably of the plate or the tubular type, well known in the art. The first holding vessel 36 is preferably thermally insulated (not shown).

Vessel 24 may be jacketed (not shown) for heating, in which case pump 28 may by directly connected to line 38. In such a case, valve 30, heat exchanger 32 and line 34 are not necessary.

There are also provided a second holding vessel 40, a first pump 42, and a second pump 44, in a manner that the first pump 42 communicates with the first holding vessel 36, while the second pump 44 Communicates with the second holding vessel 40. The pumps 42 and 44 are preferably metering pumps adapted to merge predetermined amounts of contents from the respective holding vessels 36 and 40 into one stream in merge line 46. Merge line 46 is preferably connected to a mixer 48, which is preferably a static mixer. The second holding vessel 40 is preferably thermally insulated (not shown) or even more preferably jacketed (not shown) for circulating cold fluid and keeping its contents cool, preferably between 60° and 32° F.

The mixer 48 is in turn connected to a controlled volume vessel 50, which is provided with a level switch 52. The level switch 52 is adapted to turn the pumps 42 and 44 off when the contents of the controlled volume vessel 50 exceed a high predetermined level 54 and turn them on again when the contents go under a low predetermined level by techniques well known to the art. The level switch may be single or a combination of switches, such as electrical, mechanical, optical, acoustical, and the like, or a combination thereof, well known in the art of level switches. Although in this particular case, the level switch is shown to be outside the controlled volume vessel 50, it may also be inside the controlled volume vessel 50, or both inside and outside.

The controlled volume vessel 50 is connected in sequence to a cooler 58 having a front end 60 and a back end 62. The cooler is preferably a scraped surface heat exchanger.

There is also provided a third pump 64 between the controlled volume vessel 50 and the cooler 58, adapted to advance contents from the controlled volume vessel 50 to and through the cooler 58 from the front end 60 toward the back end 62 at a predetermined rate. The back end 62 of the cooler 58 is connected through a second valve 66 and line 67 to a die 68, which may be a single die or a multi-branched die, preferably comprising equidistant branches as better shown in FIG. 4. A single die, for example, may be just a tube having the desired diameter as better shown in FIG. 3A, or a larger diameter tube 68b with a restricted opening 70 of the desired diameter for the yolk cylinder, as better shown in FIG. 3B. Any other configurations are possible, as long as they provide the proper opening. A multi-branched die (FIG. 4) preferably contains an even number of dies which are equidistant from the line 67. By the term "equidistant branches", it is meant that the gelled yolk will travel substantially the same distance to exit each die as a cylinder. This condition is very critical to attain equal rates of yolk coming out of each die. For example, in FIG. 4, if the dies end at cross section AA, there are two equidistant branches, if the dies end at cross section BB, there are four equidistant branches, and if the dies end at CC, there are eight equidistant branches. The same result may be achieved with non-equidistant branches, but restrictive structures, preferably variable valves, have to be connected in the shorter branches in order to restrict flow and achieve the same rate of cylinder delivery from each die.

The second valve 66 is adapted to interrupt the flow from line 67 and direct it to a secondary line 69 at will. This is useful especially at the beginning of a run to ensure proper consistency and other properties of the yolk mixture before it enters the die 68, or for any other reason that the entrance of egg yolk mixture to the die 68 is undesirable.

All vessels are preferably covered with covers 25 and preferably operate with blankets of a clean gas (not shown), preferably nitrogen. Other gases, such a carbon dioxide, noble gases, cleaned air by filtration Or other means, gases including air which contain microbial growth inhibitors such as ozone, oxygen anions, and the like for example, may also be used. The term "blanket of a gas" means that a small amount of clean gas is forced to enter the vessel and cause a positive pressure under the cover and over any contents in the vessel, as compared to the atmospheric pressure outside the vessel, so that the contents of the vessel do not get contaminated from impurities in the environment of the vessel. This is very well known technology in the art, and it is used not only in the food industry to avoid microbial contamination, but also in many other industries, such as the paint industry, for example, mainly to prevent oxygen from entering the system, which could cause explosions when mixed with vapors of combustible materials contained in the vessel.

In operation of the yolk cylinder station 12, better shown in FIG. 2, artificial-egg-yolk materials which include a positive thermoreversible gel former, such as gelatin for example, are mixed in the mixing vessel 24 by means of a mixer 26, such as a "lightning" mixer for example, well known to the art, or any other type of mixer, or even manually with the help of a paddle. Other useful artificial-egg-yolk materials include but are not limited to water, starch, milk, preferably of the non-fat type, colorants, such as beta-carotene or other FDA approved colors for example, flavorings, and the like. The positive thermoreversible gel former provides the artificial egg yolk with a gel temperature under which the mixture is in the form of a gel, under equilibrium conditions, and over which, the artificial egg yolk is flowable. The gel temperature with the preferred positive thermoreversible gel formers is in the range of 80° to 100° F.

Preferably, the water is added first in the mixing vessel 24. Preferably, with the circulating pump 28 in an off position, the mixer 26 is turned on, and the solid raw materials, preferably after having been premixed together, are added slowly, preferably at room temperature. Preferably, when a uniform dispersion or emulsion or solution, or a combination thereof has been realized in the mixing vessel 24 in the form of a first mixture, the first valve is turned to direct flow toward the heat exchanger 32, and the circulation pump is turned on. The first mixture is heated as it passes through the first heat exchanger 32 and re-enters the mixing vessel 24 through line 34. The heating and recirculation is continued until the first mixture attains a desired first temperature. The first temperature should be higher than the temperature required to dissolve the positive thermoreversible gel former, gelatin for example, and to hydrate the starch, if present, or to uniformly distribute any other ingredients present. For sanitary purposes it is critical that the desired first temperature is higher than 140° F., which is the temperature of pasteurizing egg-whites. Preferably, it is in the range of 150° to 190° F., and more preferably in the range of 160° to 180° F. By raising the temperature at these levels and for periods of time preferably between 5 and 60 minutes (including time in the first holding vessel), low or no microbial count may be realized.

As aforementioned, the mixing vessel 24 is preferably covered with a cover 25, and provided with a blanket of clean gas, well known to the art, to prevent microbial contamination. As also aforementioned, the valve 30 and the heat exchanger 32 are not necessary if the mixing vessel is jacketed and thus heated with a hot fluid, such as water or steam for example.

In sequence, the circulation valve 30 is turned in a manner to direct flow to the first holding vessel 36 through line 38. The first holding vessel 36 is preferably thermally insulated by well known to the art techniques, and also preferably covered with one of covers 25, and blanketed with a clean gas (not shown) as explained previously. An excess of first mixture is always in the first holding vessel 36, so that further uninterrupted operation of the system takes place.

After the first mixture has been transferred to the first holding vessel 36, a new first mixture may be prepared in the mixing vessel 24, as already explained. This way, while the first mixture is made in a batch mode, the process is substantially continuous, as it will be realized later in this description.

A liquid comprising egg white, preferably pasteurized egg-white, which may contain other ingredients, such as thickeners, flavorings, colorings, and the like is disposed in the second holding vessel 40. This liquid is maintained at a second temperature, preferably between 60° and 32° F., and more preferably between 40° and 32° F. Preferably thermal insulation (not shown) outside the second holding vessel or more preferably a cooling jacket (not shown) maintain the temperature within the desired levels.

As aforementioned, the second holding vessel 40 is preferably covered with a cover 25, and provided with a blanket of clean gas, well known to the art, to prevent microbial contamination. It is also preferably covered with one of covers 25, and blanketed with a clean gas (not shown) as explained previously.

The first mixture from the first holding vessel 36 and the liquid from the second holding vessel 40 are caused to merge together in the form of a second mixture in merge-line 46 by means of the first 42 and the second 44 pumps, respectively, in such quantities that the second mixture attains a third temperature, which is higher than the gel temperature of the egg yolk and lower than a temperature at which the egg-white coagulates under the conditions of the process of the instant invention. The coagulation temperature depends on time of exposure at that temperature, but usually is over 130° F. The preferred third temperature range is in the range of 100° to 130° F. The merged streams of the first mixture and of the liquid comprising egg-white, which form the second mixture in the merge line 46, are preferably mixed further by means of mixer 48, which is preferably a static mixer.

Since positive thermoreversible gel formers, such as gelatin for example, when used in ample quantities tend to make the yolk absorb water and swell when the yolk is in contact with liquid egg-white, it is preferable to use the minimum possible amount of positive thermoreversible gel former in the formulation, which amount, however, is adequate to give enough strength to the gel led yolk to withstand the conditions of the present process.

In turn, the second mixture, being still flowable is introduced into the controlled volume vessel 50. The purpose of the controlled volume vessel 50 is to provide a continuous source of flowable material which may be pumped with the third pump 64 into the cooler 58, in which it gels by the time it reaches the back end 62 of the cooler 58. Although the pump 64 is preferably a positive displacement pump, it cannot pump gelled artificial yolk, most probably due to cavitation. Thus, it is important to position the pump at a point where the second mixture is still flowable, so that it can be pumped and push the gel in front of it to be extruded through the die 68.

The first pump 42 and the second pump 44, preferably work simultaneously and are adapted to deliver the respective material in such a ratio that will fulfill the above mentioned conditions. A preferred weight ratio is in the range of 75/25 to 50/50 of first mixture from the first holding vessel 36 to liquid from the second holding vessel 40, provided the above mentioned conditions are met.

In order to prevent overflow in the controlled volume vessel 50, the level switch 52 turns both first and second pumps off when the second mixture exceeds a predetermined high level 54, and reactivate the first and second pumps when the second mixture goes under a low predetermined level 56. The first and second pumps 42 and 44 are arranged to deliver a slightly higher quantity of material as compared to the material pumped by the third pump 64. This way, the turn on and off of the first and second pumps is minimized. It should be noted, however, that the first and second pumps should not be allowed to deliver less material than the material pumped by the third pump 64, to prevent the pump 54 from running dry.

The gelled and homogenized yolk exiting the back end 62 of cooler 58, which cooler is preferably a scraped surface heat exchanger as aforementioned, goes through the second valve 66, which initially directs the artificial yolk to the secondary line 69 for examination. If the yolk is according to desired specifications, and especially of desired gel consistency, the secondary valve 66 is caused to redirect the flow of the yolk to the die 68 through line 67.

Figure 3A:
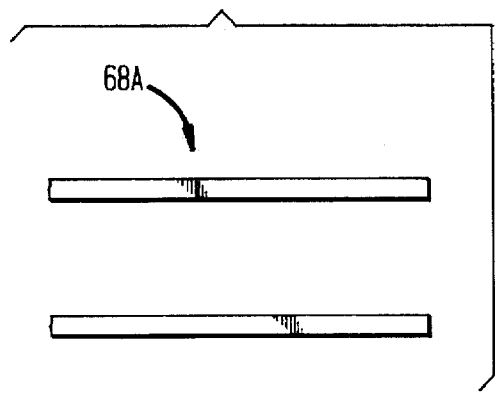
FIG. 3A illustrates a die in the form of a tube for making a yolk cylinder according to the present invention.
Figure 3B:
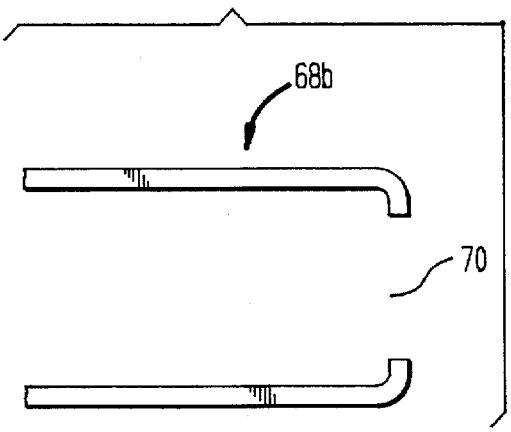
FIG. 3B illustrates a different die having a restricted opening according to the present invention.
Figure 4:
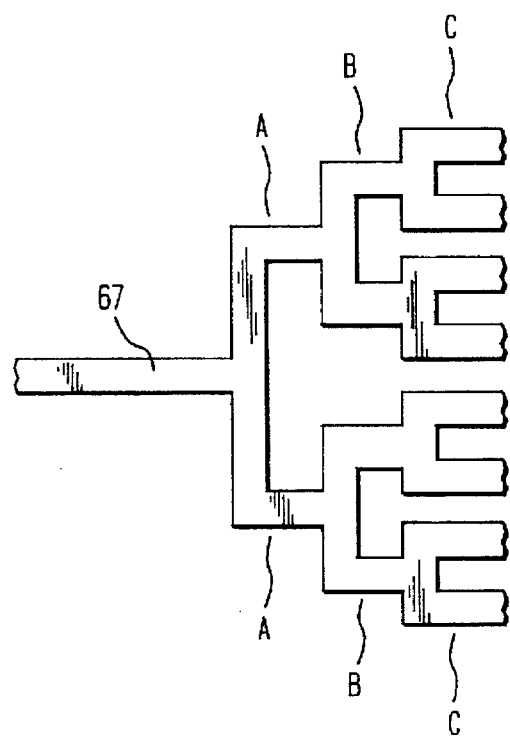
FIG. 4 illustrates a multi-branched die according to the present invention.

If the die is a single die as shown in FIGS. 3A and 3B, a yolk cylinder starts being formed having the diameter of the tube 68a or of the opening 70, respectively. If the die is multi-branch die as shown in FIG. 4, a respective multiplicity of cylinders will start being formed at the end of the branches, which are preferably equidistant as explained and defined earlier. The amount of yolk material coming off each branch will be about the same.

At this point the disk cutting station 14 (FIG. 1) performs the operations described hereinbelow.

Figure 5:
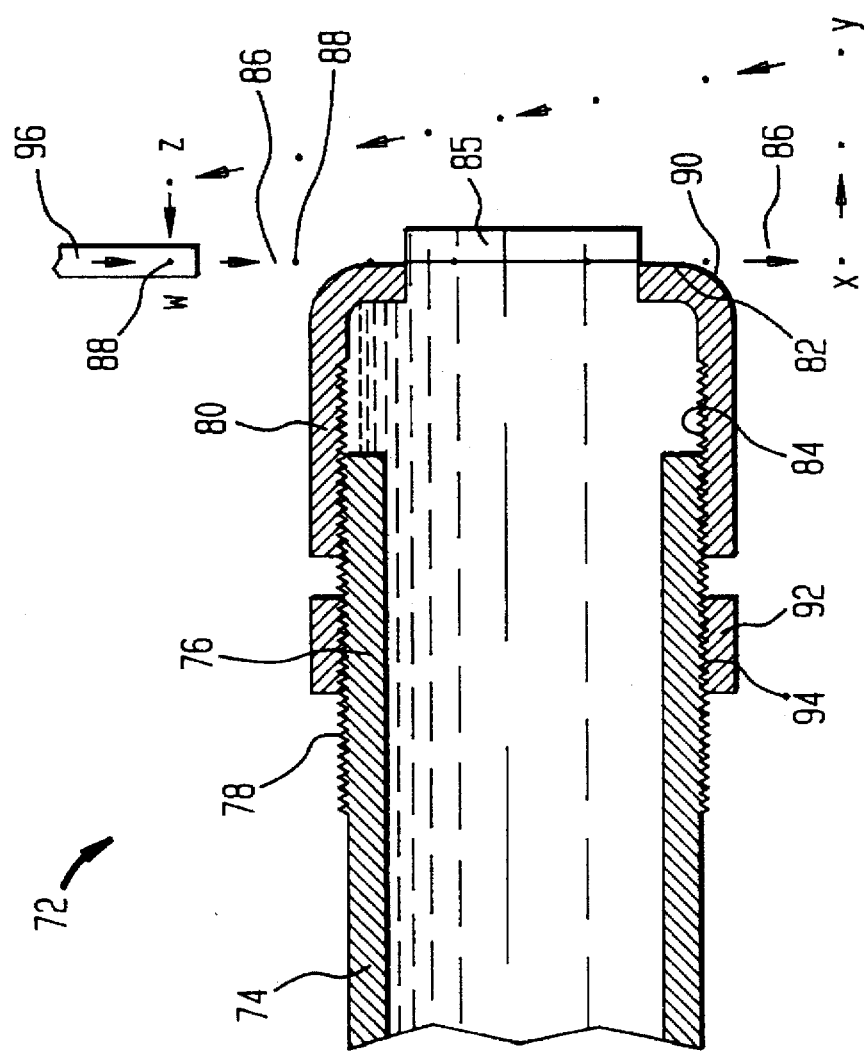
FIG. 5 illustrates a highly preferred die according to the present invention having an adjustable extrusion head.

In the cutting station 14, it is highly preferable that the single die, or each branch of a multi-branched die comprises an extrusion array 72 as better shown in FIG. 5. The extrusion array 72 comprises a main cylinder 74 having a front end 76 with a first set of threads 78. The extrusion array 72 also comprises an extrusion head 80 having a front surface 82 and a second set of threads 84 commensurate to the first set of threads 78 of the main cylinder 74. The extrusion head 80 may be threaded on the main cylinder to a desired degree in order to attain a desired position. At this position, the front surface 82 substantially coincides with the cutting path 86 of a cutting wire 88, so that when the cutting wire 88 follows the cutting path 86 from point W to point X, the cutting wire 88 slides on the front surface 82 of the extrusion head 80, thus cutting the extruded yolk 85 in the form of a disk. The extrusion head 80 has rounded edges 90 in order to ignore accidental small misalignment of the front surface 82 with respect to the cutting path 86. It is preferable that a locking mechanism is adapted to lock the extrusion head 80 in position. Preferably, the locking mechanism comprises a nut 92 having a third set of threads 94 commensurate to the first set of threads 78. When the extrusion head 80 is in the desired position, the nut 92 is turned in a manner to come in close contact with the extrusion head 80 and lock it at the desired position. It is very important for the cutting wire 88 to slide on the front surface 82 of the extrusion head 80 for a clean and fast cutting of the extruded yolk 85.

The cutting wire 88 is supported on a frame 96, and it is adapted to initially follow the aforementioned cutting path 86 from point W to point X, and finally the rest part XYZW of a whole loop WXYZW, as it will be explained in detail hereinbelow. The cutting path has a first direction indicated by the arrows from point W to point X. The first direction of the cutting path 86 is preferably substantially vertical.

The diameter of the cutting wire 88 is preferably in the range of 1/64' to 3/32', and it is preferable that the cutting wire 88 is being wetted during the operation of cutting the artificial egg yolk disks.

Figure 6A:
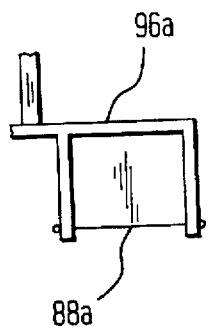
FIG. 6A illustrates a cutting wire supported by a frame according to the present invention.

FIG. 6A better illustrates a cutting wire 88a supported on a frame 96a according to the present invention.

Figure 6B:
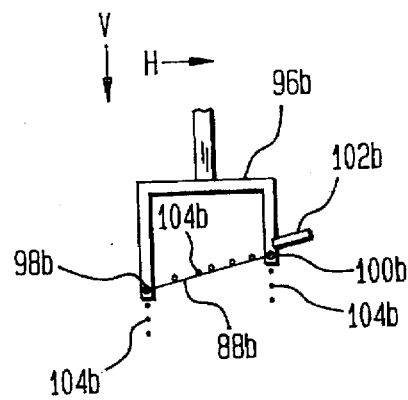
FIG. 6B illustrates an inclined cutting wire supported on a frame with a fluid dispenser at a high point of the frame according to the present invention.

Preferably, the frame 96b has a low point 98b and a high point 100b, as better shown in FIG. 6B. The cutting wire 88b extends from the low point 98b to the high point 100b in a second direction, which second direction deviates from substantially horizontal, as shown by the arrow H. This deviation is preferably in the range of 3 to 45 degrees, more preferably in the range of 5 to 30 degrees, and even more preferably in the range of 10 to 20 degrees. It is also preferable that the first direction of the cutting path is substantially vertical, as shown by the arrow V.

At the higher end 100b, there is located a fluid dispenser 102b, which is adapted to provide a wetting liquid 104b, preferably comprising water, such as tap water or a solution of a cross-linker or setting agent for example, as it will be explained at a later section. As the wetting liquid 104b is dispensed on the cutting wire 88b in the vicinity of the high point 100b, the wetting liquid 104b starts flowing on the cutting wire 88b in a downhill direction from the high point 100b to the low point 98b, due to a combination of surface tension and gravity phenomena. At the low point 98b the wetting liquid 104b falls downward due to gravity. Some excess wetting liquid 104b also falls downward in the vicinity of the high point 100b. In this way, the cutting wire 88b is maintained wet during the operation of the cutting process.

Wetting of the cutting wire is very important for considerably better cutting of the egg yolk disks from the egg-yolk cylinder, as it will also be better described later on.

Figure 6E:
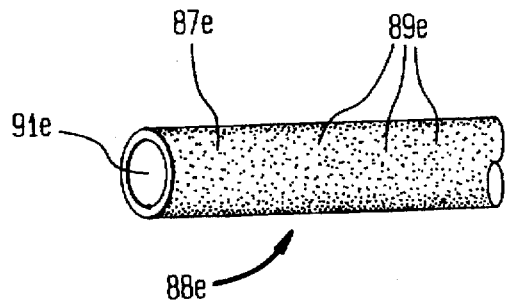
FIG. 6E illustrates a porous or perforated cutting wire according to the present invention.

An alternate way for the cutting wire to be wetted is shown in FIG. 6E, where the cutting wire 88e is hollow and porous. The magnified view of the cutting wire 88e shows the pores 89e, through which the wetting liquid exudes to the surface 87e from the core 91e, in which the wetting liquid is under adequate pressure to allow an adequate amount of wetting liquid to maintain the surface 87e of the porous cutting wire 88e wetted. Such porous wires may be made by well known to the art techniques, such as metal or ceramic sintering for example. Also, plastic tubes, similar to the ones used for underground watering of plants, but appropriately small in diameter may be used for this purpose. A fluid dispenser (not shown) connected to the core 91e of the porous wire 88e provides the pressurized wetting liquid as described above.

Figure 6C:
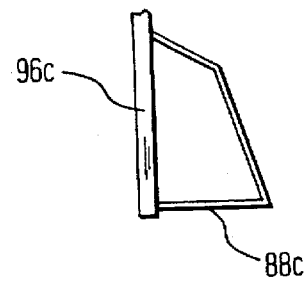
FIG. 6C illustrates a different configuration of a cutting wire supported by a frame according to the present invention.

Still another way of maintaining the wire wet is by spraying. Such an arrangement is better shown in FIG. 6G, where the cutting wire 88g supported by the frame 96g is wetted with the sprayed wetting liquid 104g from the fluid dispenser or spray nozzle 102g. It is preferable that the spray nozzle 102g provides a flat spray pattern pointed in a way to wet the wire without excessive overspray.

Figure 6F:
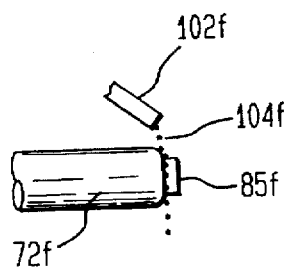
FIG. 6F illustrates an arrangement, wherein the fluid dispenser is located above the extrusion head, and wets the cutting wire indirectly, as the cutting wire cuts a yolk disk according to the present invention.

Instead of attempting to wet the cutting wire directly, the extruded egg yolk 85f may be wetted by a fluid dispenser disposed on top of the extrusion array 72f, as better shown in FIG. 6F. The wetting liquid 104f wets the yolk, but also the cutting wire (not shown) as the cutting wire moves in a manner discussed above to cut the extruded yolk to a disk.

Figure 6D:
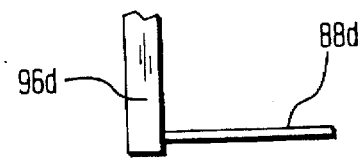
FIG. 6D illustrates still a different configuration of a cutting wire supported by a frame according to the present invention.
Figure 6G:
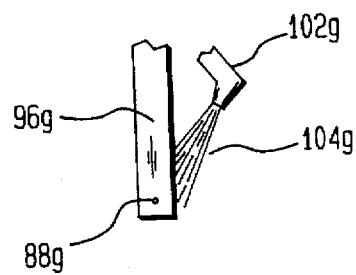
FIG. 6G illustrates a cutting wire supported by a frame with a fluid dispenser wetting the wire with a spray according to the present invention.
Figure 7:
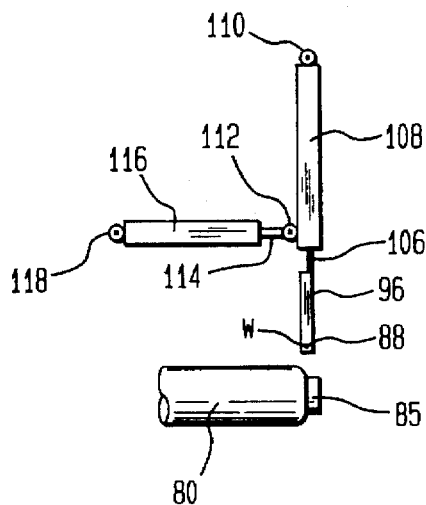
FIG. 7 illustrates the initial position of a cutting wire supported by a frame activated by an assembly of two cylinders according to the present invention.
Figure 8:
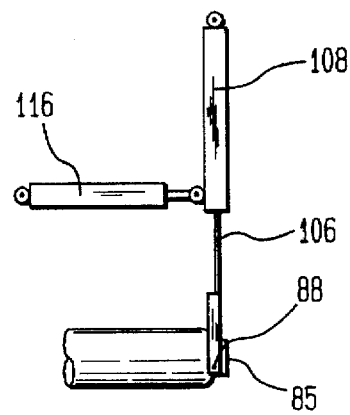
FIG. 8 illustrates a position of a cutting wire supported by a frame activated by an assembly of two cylinders while the wire is cutting a yolk disk according to the present invention.

If the cutting wire 88c is sturdy enough, it may be supported on the frame 96c as illustrated in FIG. 6C. If the cutting wire is even more sturdy it may be in the form of a single prong 88d supported on a frame 96d, better shown in FIG. 6D, In order to perform the appropriate movement for the cutting wire 88 (FIG. 5) to follow the path WXYZW, the frame 96 of the cutting wire 88 is connected to the stem 106 of a first cylinder 108, which is preferably air activated, as better shown in FIG. 7. The first cylinder 108 is preferably disposed above the extrusion head and pivoted at a first pivot point 110, away from the stem 106. It is also pivoted at a second pivot point 112, close to the stem 106. The second pivot point 112 is attached to one end of the stem 114 of a second cylinder 116, which is also preferably air activated. The end of cylinder 116 away from stem 114 is pivoted at a third pivot point 118. A number of micro-switches, and other controls are not shown for clarity, as being well known to the art.

In operation of the disc cutting station 14 (FIG. 1), the extrusion head 80 (FIG. 5) is turned until it is in such a position that when the frame 96 moves in a downward direction from point W to point X, the cutting wire 88 slides on the front surface 82 of the extrusion head 80. By means of locking nut 92, the extrusion head is locked in that position. Although, even without the cutting wire 88 coming in contact with the front surface 82, the system is operable, the quality of the yolk disks cut and the speed at which they can be cut improves highly when the cutting wire 88 comes in contact with or slides on the front surface 82.

Figure 9:
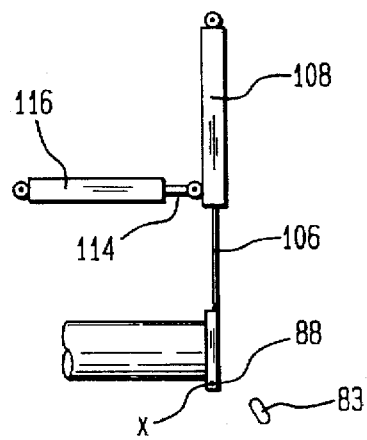
FIG. 9 illustrates a position of a cutting wire supported by a frame activated by an assembly of two cylinders after the wire has cut a yolk disk according to the present invention.
Figure 10:
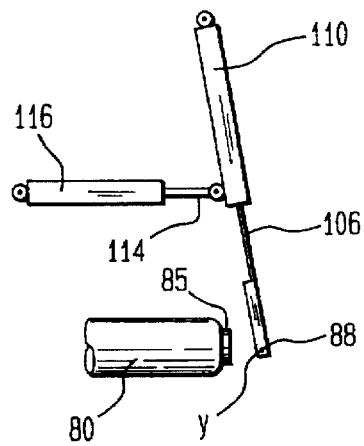
FIG. 10 illustrates a different position of a cutting wire supported by a frame activated by an assembly of two cylinders after the wire has cut a yolk disk according to the present invention.
Figure 11:
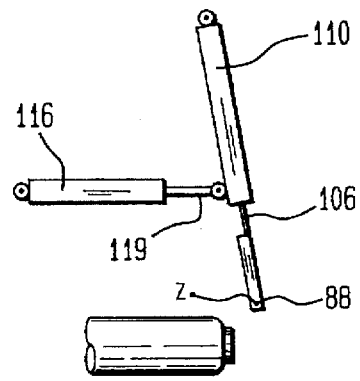
FIG. 11 illustrates still a different position of a cutting wire supported by a frame activated by an assembly of two cylinders after the wire has cut a yolk disk according to the present invention.

As the gelled yolk 85, made in the yolk cylinder station, starts being extruded from the extrusion cup 80, the cutting arrangement shown in FIGS. 7 to 11 is turned on. The initial position of this system is the one shown in FIG. 7. At this position, the cutting wire 88 is at point W (see also FIG. 5). When the system is turned on, the cylinder 108 is activated by compressed air, and stem 106 starts expanding in a manner to start cutting a yolk disk (FIG. 8), until it reaches point X (FIG. 9). By that time, a yolk disk 83 has been cut and enters the disk coating station 16 (FIG. 1), which will be discussed later. When the cutting wire 88 reaches point X, cylinder 116 is activated and stem 114 expands to bring to bring the cutting wire 88 to point Y (FIG. 10). At point Y, cylinder 110 is deactivated (or activated in an opposite direction) so that the stem 106 contracts back to its initial position, and the cutting wire 88 finds itself to point Z (FIG. 11). When the cutting wire 88 reaches point Z, cylinder 116 is deactivated (or activated in an opposite direction) so that the stem 114 contracts back to its initial position, and the cutting wire 88 finds itself to the initial point W (FIG. 7), thus completing the loop WXYZW. In sequence, this cycle is repeated until the system is turned off. A number of switches, controls, and other auxiliary equipment are not shown since they present very well known assemblies to a person of ordinary skill in the art. In addition, the type of cutting wire or wetting arrangement are not shown, since they have been adequately explained in the description of FIGS. 6A to 6G, and they would complicate unnecessarily FIGS. 7 to 11.

In the case of multi-branched dies, only one cylinder set (two cylinders) may be used to activate the cutting wires of all branches, if the branches are equidistant, as aforedescribed. This is a great advantage of having equidistant branches.

A preferable rate is about 40 to about 90 cycles or loops per minute, while a most preferable rate is about 50 to 80 cycles or loops per minute.

Depending on the above rate, the third pump 64 (FIG. 2) is controlled to pump at such a rate that a desirable thickness of egg yolk disks is produced. The preferred thickness is in the range of ⅛ to ½ inch, and a more preferred thickness is in the range of ¼ to ⅜ inch.

Conventional electro-optical or other type of detectors, well known to the art, may be added to detect the thickness of the extruded yolk and activate the cylinder arrangement every time the yolk reaches a desirable thickness. The cylinder arrangement should then be such as to perform only one cycle or loop every time is activated by the detectors.

Figure 12:
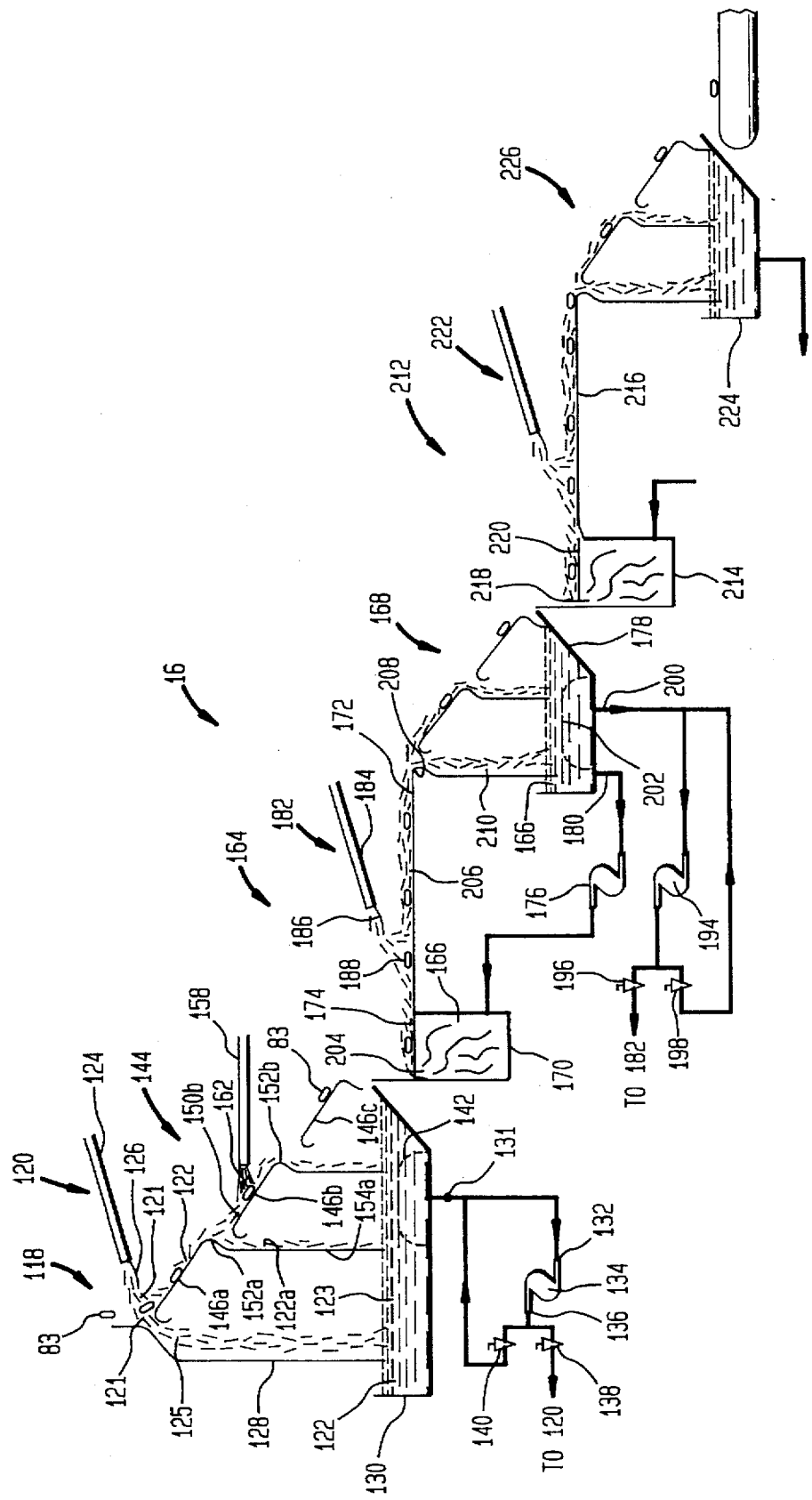
FIG. 12 illustrates a preferred coating station according to the present invention.

The egg-yolk disk 83, after being cut from the yolk cylinder 85 which is extruded from the extrusion head 80 as shown in FIGS. 5 to 11, and particularly in FIG. 9, enters or falls in the disk coating station 16, as better shown in FIGS. 1 and 12.

The apparatus shown in FIG. 12, and the corresponding coating method may be used to encapsulate any type of article. However, it is especially useful and critical for coating the egg yolks of the present invention, which yolks before coating are particularly delicate, due to the small amount of gelatin used in their formulation in order to avoid water pick up when the yolks are stored in liquid egg white. In the following discussion, an exemplary description will be given for encapsulating a yolk disk of the present invention with a restrictive barrier. However it should be understood that a different article may take the place of the yolk disk.

The importance of the apparatus and method of the present invention is mainly attributed to the partial or preferably total absence of moving mechanical parts, such as paddles, spoons, scoops, perforated baskets, and the like, for example, in the encapsulation portion of the apparatus and during the encapsulation steps. Fluids are not considered as mechanical parts.

Figure 13:
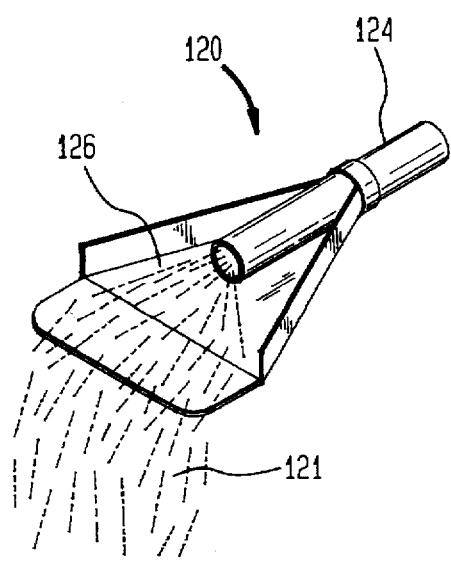
FIG. 13 illustrates a first liquid curtain generator according to the present invention.

Referring now to FIG. 12, there is provided a first liquid wetting station 118, which comprises a first liquid curtain generator 120 for producing a curtain 121 of a first liquid 122, which contains a first reactant, in order to excessively wet the yolk 83. The first liquid curtain generator 120, better illustrated in FIG. 13, comprises a tubular portion 124 and a flaring portion 126 for producing the curtain 121. The first liquid wetting station 118 also comprises a back wall 128 for directing the liquid from curtain 121 to a first tank 130, which is preferably jacketed (not shown) in order to accept cold liquid and maintain the first liquid 122 cold. The first tank 130 communicates through line 1 31 with the inlet 132 a fourth pump 134, the outlet 136 of which is connected to a third valve 138 and a fourth valve 140. The third valve 138 and the fourth valve 140 regulate the amount of first liquid 122 delivered to the first liquid curtain generator 120, as it will be explained in the section describing the operation of this part of the apparatus. A large strainer 142 on top of line 131 prevents any yolk disks that might enter accidently the first tank 130 from being disintegrated and recirculated through the system.

Figure 15:
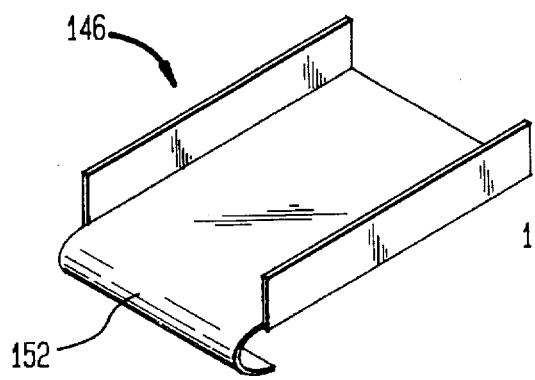
FIG. 15 illustrates different sliding plate according to the present invention.
Figure 14:
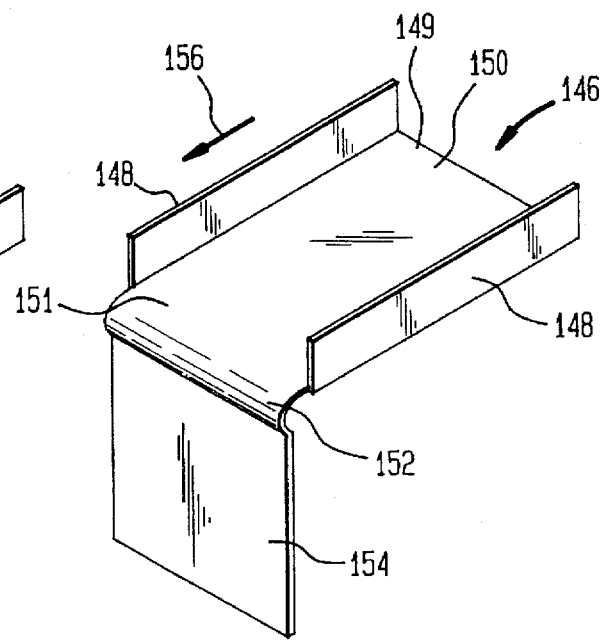
FIG. 14 illustrates a sliding plate according to the present invention.

There is also provided a first separator 144 comprising one or more, preferably 2 to 4, and more preferably three sliding plates 146, such as 146a, 146b, and 146c in this particular example (called sliding plates 146 collectively). FIG. 14 shows in better detail a sliding plate 146. The sliding plate 146 preferably comprises two side walls 148, a primary area an upper end 149, a lower end 151, a curvature at the lower end 151 152, an anti-splashing wall 154, and a direction from the upper end 149 to the lower end 151, indicated by arrow 156, which is parallel to the inclination of the primary area 150 of the sliding plate 146. The anti-splashing wall is used to prevent excessive splashing of first liquid 122 as it falls from the sliding plate(s) 146 to the tank 130. Thus, in the absence of the anti-splashing wall 154, the sliding plate 146 would look as shown in FIG. 15.

Figure 16:
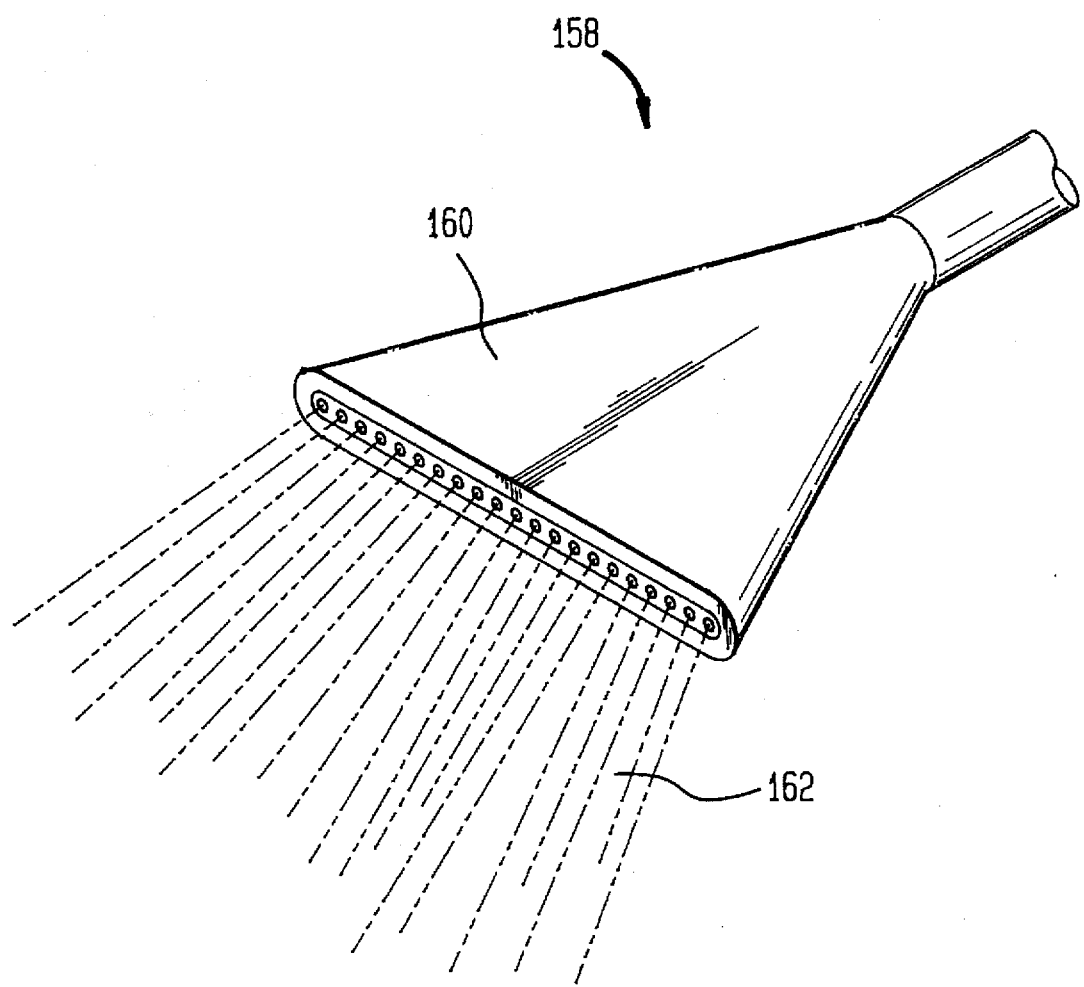
FIG. 16 illustrates a gas blower according to the present invention.

A gas blower 158, preferably adapted to form a gas curtain, is also provided in front of the sliding plates 146, as shown in FIG. 12. In the case of using three sliding plates 146a, 146b, and 146c, as in the present example, it is preferable that the gas blower 158 is disposed in front of the middle sliding plate 146b, in a preferably substantially horizontal direction. A better detail of a preferred gas blower 158 is illustrated in FIG. 16. The gas blower comprises a flared front part 160, which is adapted to form a gas stream in the form of a curtain.

The angle of inclination of the sliding plates 146, or in other words the angle formed by the plane containing the primary area 150 of the sliding plate 146 and the plane containing the surface 123 of the first liquid 122 should be high enough, so that the yolk 83 or other article wetted in the first liquid wetting station 118 follows a first path away from the curvature 152 in an initial direction substantially parallel to the direction of the sliding plate 146 or primary area 150, while at least part of the liquid 122 follows a second path at least partially coinciding with the curvature. The angle of inclination, or inclination, of the sliding plates 146 is preferably in the range of 30 to 70 degrees, more preferably in the range of 45 to 70 degrees, and even more preferably in the range of 50 to 60 degrees. If the angle is smaller than 30 degrees, the yolk or other article may not slide and stop on one of the sliding plates 146, while if the angle is larger than 70 degrees, en excessive amount of liquid may start taking the same direction as the initial direction of the yolk or other article leaving that plate, and in addition, the yolk or other article may start tumbling instead of sliding.

It is highly preferable that the sliding plate 146 has a first surface tension and an inclination, and the first liquid 122 has a second surface tension, the first surface tension being higher than the second surface tension, thereby causing the first liquid 122 to follow the second path, and wherein the inclination is adequately high to cause the article to follow the first path referred to hereinabove. Ways to increase the surface tension and wetablility of the sliding plates is to either flame treat them or sand them by well known to the art techniques to a point that the first liquid wets them.

The operation of the part of the apparatus 16 described above is as follows:

With the third valve 138 closed and the second valve 140 open, the fourth pump 134 is turned on. The operator starts opening then the third Valve 138 slowly until liquid 122 starts appearing at the flaring portion 126 of the first liquid curtain generator 120. At this point the operator opens further the third valve 138 until a desired amount of first liquid forms a liquid curtain 121. If more liquid is needed, the fourth valve is closed slowly until the desired amount of liquid is delivered.

If no liquid appears after complete opening of valve 138, the fourth valve 140 is closed slowly until liquid appears at the flaring portion 126 of the first liquid curtain generator 120. At this point the operator closes further the fourth valve 140 until a desired amount of first liquid forms a liquid curtain 121.

Instead of the two valves 138 and 140, one can use a controller for controlling the speed of the pump 134, so the appropriate amount of liquid may be delivered to the liquid curtain generator 120.

The first liquid 122, containing a first reactant, is preferably kept cold in a range of preferably 32° to 60° F., and more preferably 35° to 45° F., by circulating a cold liquid through a jacket (not shown) around the first tank 130. However, the temperature might also be at room levels around 70° F. or even higher. The low temperatures help in maintaining the integrity of the gelled yolk, and also inhibit considerably microbial growth.

The first reactant preferably comprises a cross linker, which preferably comprises a multivalent ion selected from a group consisting of calcium, magnesium, aluminum, and a mixture thereof.

As the liquid curtain 121 is formed, a major portion of the liquid passes through the first opening 125 and follows a path on the back wall 128 until it re-enters the first tank 130. Another portion of the first liquid is diverted onto the sliding plate 146a, and after it follows the curvature 152a and the anti-splash wall 154, it also re-enters the first tank 130. At this point, substantially no first liquid is transferred to the middle sliding plate 146b, or to the final sliding plate 146c.

It should be understood that the distance and exact position of each plate is easily arranged by the operator, if it has not been pre-arranged, for receiving optimum results.

When a yolk disk 83 from the disk cutting station 14 (FIG. 1) enters the disk coating station 16 by falling (FIG. 12) through curtain 121 on the first sliding plate 146a, it is wetted excessively by the first liquid 122, and it slides until it jumps onto the second sliding plate 146b as it follows a first path away from the curvature 152a in an initial direction substantially parallel to the direction 156 (FIG. 14) of the sliding plate 146a, while at least part of the liquid 122 follows a second path at least partially coinciding with the curvature 152a, and then it follows the anti-splash wall 154a to re-enter the first tank 130. As the wetted yolk disk 83 jumps on to the second sliding plate 146b, it carries with it a considerable amount of first liquid. Some of the first liquid finds itself on the sliding plate 146b substantially away from the yolk disk, and an excess of the first liquid finds itself on top and periphery of the disk. When the yolk disk passes through the gas curtain 162, the majority of the excess of the first liquid lying on top and on the periphery of the disk is wiped away, so that when the yolk disk jumps onto the next sliding plate, said yolk disk is substantially free of excess first liquid, but still well covered by a thin continuous layer of first liquid. As it jumps to the third sliding plate 146c, it may carry with it a small amount of first liquid. The excess of first liquid onthe second sliding plate 146b and the first liquid on the third sliding plate 146c follow a similar path on the respective sliding plates as described in the case of sliding plate 146a, and finally they re-enter the tank 130.

Finally the yolk disk 83 jumps to a second liquid wetting station 164 (FIG. 12) adapted to treat the wetted egg-yolk disk or other article with an excess of a second liquid 166 containing a second reactant, which second reactant reacts with the first reactant to form a restrictive barrier encapsulating the egg-yolk disk 83 or other article. In the case that the article is egg-yolk, it is preferable that the second reactant is an alginate.

The second wetting station 164 is combined with a second separator 168, which is adapted to separate the egg-yolk disk or other article from the second liquid 166.

Figure 18:
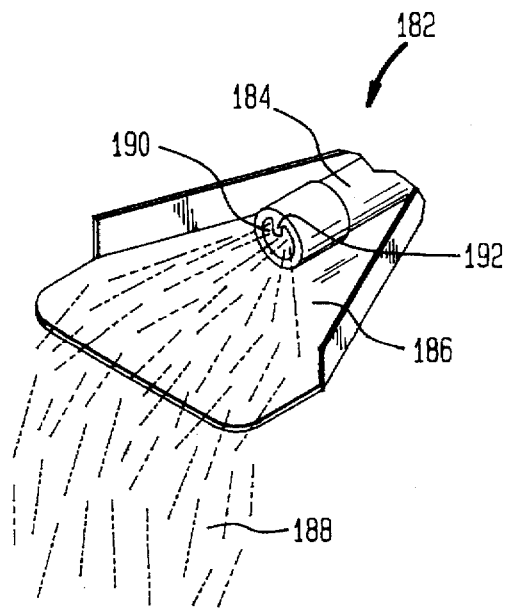
FIG. 18 illustrates a second liquid curtain generator according to the present invention.
Figure 17:
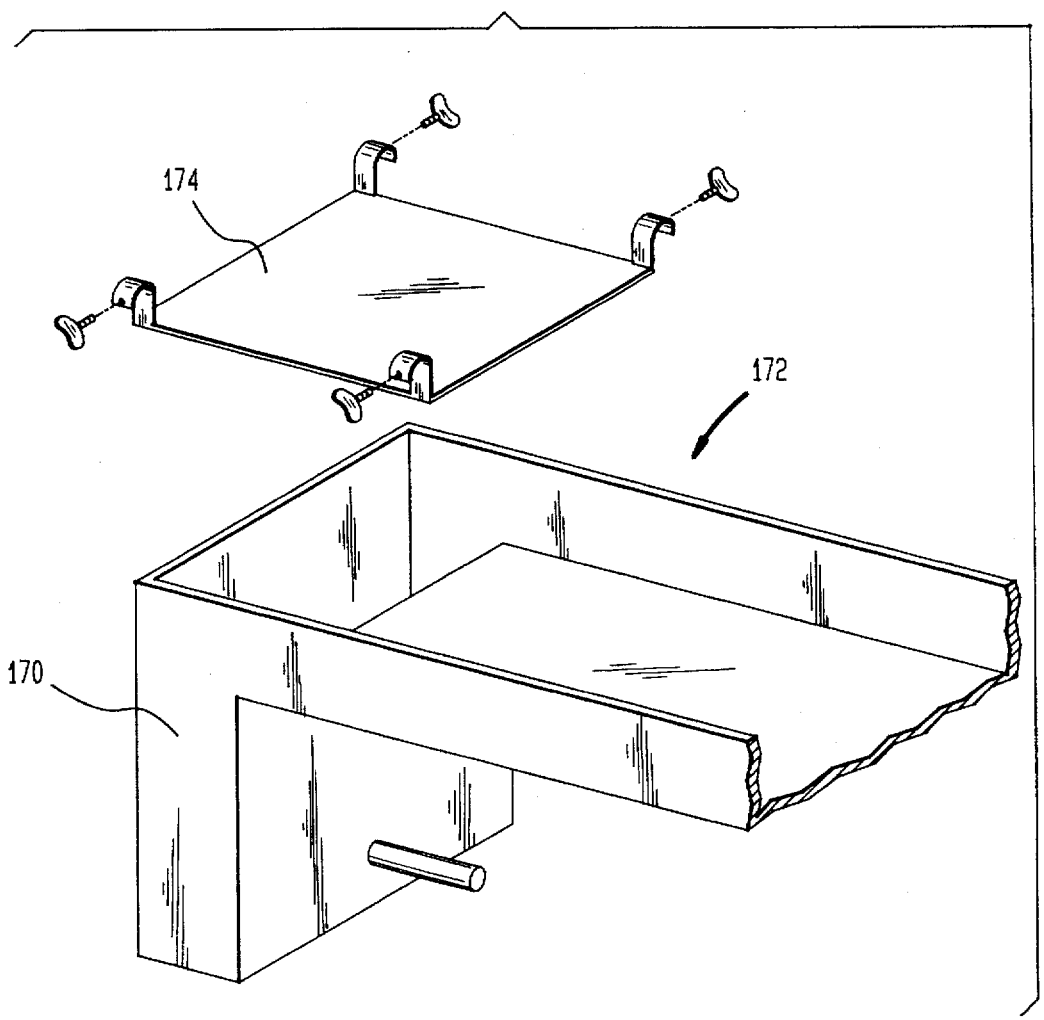
FIG. 17 illustrates a first corridor according to the present invention.

The second wetting station 164 comprises a first vat 170 which communicates with a substantially horizontal first corridor 172, through an opening 204 formed by a first flow restrictor plate 174 on top of the first vat 170, shown in more detail in FIG. 17. The length of the first corridor is preferably in the range of about 1 to about 3 feet. The second wetting station, further comprises a fifth pump 176, adaptable to provide the second vat 170 with second liquid 166 contained in a second tank 178, through line 180. There is also provided a second liquid curtain generator 182, better detailed in FIG. 18. The second liquid curtain generator 182 comprises a tubular portion 184, and a flaring portion 186. Since the second liquid 166 is of higher viscosity than the first liquid 122, the tubular section 184 requires a restricted opening 190 formed by a tongue 192, in order to spread the second liquid 166 into the form of a good continuous curtain. The degree of restriction depends on the viscosity of the second liquid and it may be easily determined and optimized by varying the restriction and observing the second liquid curtain formed.

The second liquid curtain generator 182 is provided with second liquid 166 through line 200 by means of a sixth pump 194 and fifth and sixth valves 196 and 198, respectively, in the same manner that the first liquid curtain generator 120 is provided with first liquid 122 through line 142 by means of fourth pump 134 and third and fourth valves 138 and 148, respectively. The second liquid curtain generator 182 is preferably positioned over the first corridor 172, closer to the first flow restrictor plate 174 than to the second separator 168.

A large strainer 202 on top of lines 180 and 200 prevents any yolk disks that might enter accidently the second tank 178 from being disintegrated and recirculated through the system.

The second separator 168 is substantially the same and operates in the same manner as the first separator 144 described in detail hereinabove.

In operation of the second wetting station 164, the fifth pump 176 is turned on, and the first flow restrictor plate 174 is positioned in such a location over the first vat 170, so that the liquid stream passing through opening 204 is adequately fast to prevent any yolk disks or other articles coming from the first separator 144, from entering the first vat 170. It is preferable that a stream 206 of the second liquid 166, having a thickness in the range of about ¼" to about 1", and more preferably in the range of about ⅜" to about ¾", is formed in the first corridor 172. In sequence the sixth pump is turned on to provide the second liquid curtain generator 182 with an adequate amount of second liquid 166 to generate a second liquid curtain 188 using the same procedure used for the first liquid curtain generator 120.

As the yolk disk 83 falls into the second liquid stream 206, in most cases it is covered completely by second liquid. The second reactant, which is preferably an alginate, such as sodium alginate for example, in this particular case, reacts with the first reactant (calcium chloride for example) and forms a continuous restrictive barrier or membrane encapsulating the yolk disk. However, in some occasions, the yolk disk 83 instead of being immersed in the stream, it floats. As it passes trough the second liquid curtain 188, it is covered completely with second liquid, and the encapsulation process to form a continuous restrictive barrier takes place. The yolk disk 83 is then carried by the stream over a corridor curvature 208, where the majority of the second liquid re-enters the second tank 178 after following a path over the corridor curvature 208 and along the corridor anti-splashing wall 210, while the yolk is further separated from excess of second liquid further down in the second separator 168, the operation of which is the same as the operation of the first separator 144, and it does not require further explanations.

The second liquid 166, similar to the first liquid 122, is preferably kept cold in a range of preferably 32° to 60° F., and more preferably 35° to 45° F., by circulating a cold liquid through a jacket (not shown) around the second tank 178. However, the temperature might also be at room levels around 70° F. or even higher. The low temperatures help in maintaining the integrity of the gelled yolk disk, and also inhibit considerably microbial growth.

At this point, the encapsulated egg yolk disk may enter the packaging station 18 (FIG. 1), or it may be rinsed, preferably with water in a rinsing station 212.

The rinsing station 212 comprises a second vat 214 which communicates with a substantially horizontal second corridor 216, through an opening 204 formed by a second flow restrictor plate 220 on top of the second vat 21 4. The length of the first corridor is preferably in the range of about 1 to about 3 feet. There is also provided a water curtain generator 222, similar to the first liquid generator 120, since the viscosity of water is similar to that of the viscosity of the first liquid 122. Preferably, fresh water is provided to both the second vat 214, and to the water curtain generator 222, while the water after the rinsing process, which is temporarily collected in a third tank 224, is disposed of. A third separator 226 provided after the rinsing station 212, is similar to the first and second separators 144 and 168, and need no further explanations.

The operation of the rinsing station and the following third separator are similar to the operation of the second liquid wetting station and second separator, and do not need further explanations. The only difference is that in the case of rinsing there are preferably no pumps for re-circulation since fresh water is being used and the water after rinsing is disposed of.

It is preferable that the whole coating station is enclosed in enclosure (not shown) with appropriate openings for an entry and of the uncoated egg yolk disks and for an exit for the encapsulated egg yolk disks. It is also preferable that the enclosure is maintained under positive pressure with regard to the environment. The gas provided by the gas blower 158 may be used to produce this positive pressure. If this is not adequate, additional clean gas may also be provided at any location of the enclosure, preferably away from the aforementioned entry or exit, and in a manner that the additional gas flow does not interfere with the operation of the process. By positive pressure in the enclosure, it is meant that atmospheric air does not enter the enclosure through any openings, such as the entry and exit of egg-yolk, for example, due to the flow of clean gas through such openings in a direction from the inside of the enclosure to the atmosphere. In different words, it is preferable that the enclosure operates with a blanket of a clean gas (not shown), preferably nitrogen. Other gases, such a carbon dioxide, noble gases, cleaned air by filtration or other means, gases including air which contain microbial growth inhibitors such as ozone, oxygen anions, and the like for example, may also be used. The term "blanket of a gas" means that a certain amount of gas is forced to be forced to enter the enclosure and cause a positive pressure as compared to the atmospheric pressure outside the enclosure, so that the contents of the enclosure do not get contaminated from impurities in the environment of the enclosure.

Figure 19:
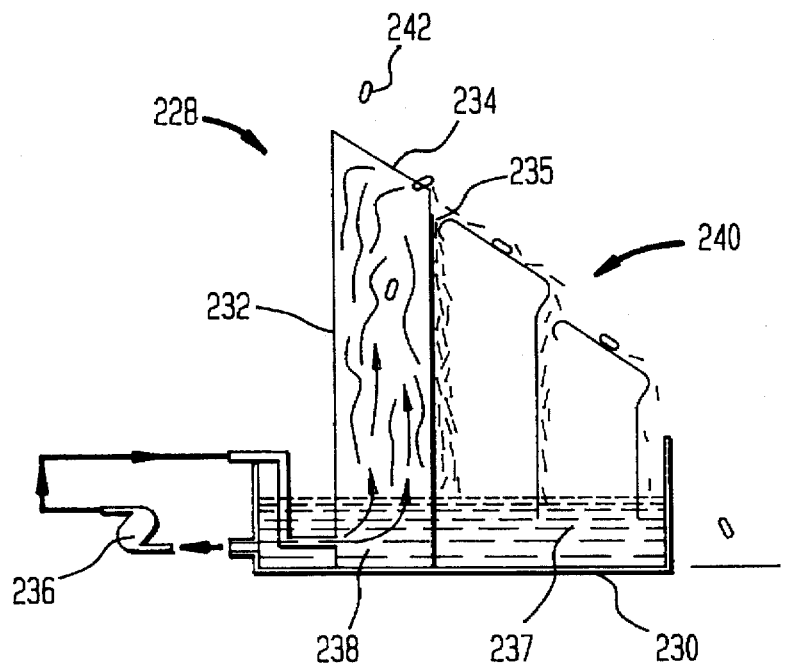
FIG. 19 illustrates a different type of a wetting station which produces an upward stream of wetting liquid, combined with a separator, according to the present invention.
Figure 20:
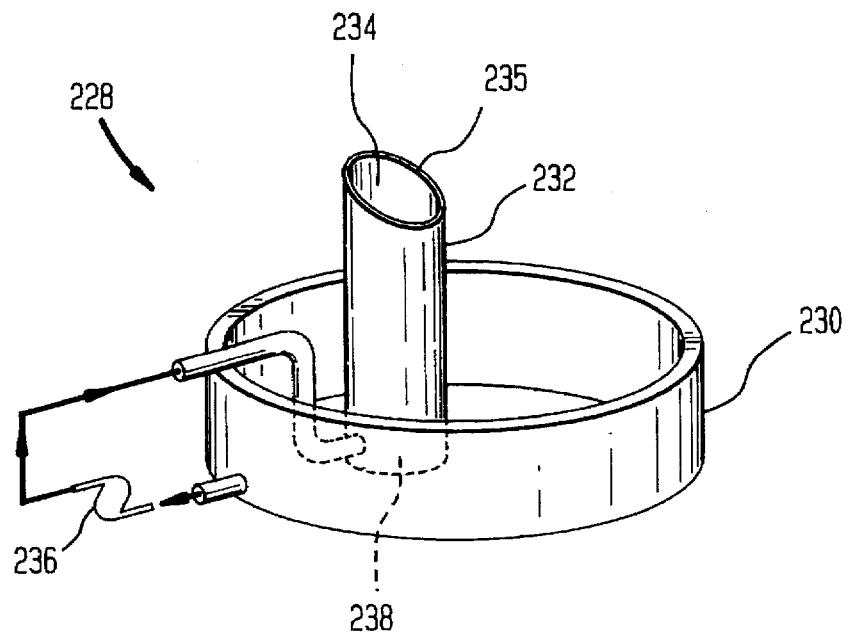
FIG. 20 is a perspective view of the wetting station of FIG. 19 according to the present invention.

A different type of wetting station, than the ones already discussed, is illustrated in FIGS. 19 and 20, according to the present invention. This wetting station 228 comprises a tank 230, having attached to it a hollow cylindrical body 232 having an inclined top opening 234, the opening 234 having a low point 235. A pump 236 is arranged in a manner to be capable of receiving wetting liquid 237 from the tank 230 and deliver it to a location in the vicinity of the bottom 238 of the cylindrical body 232. A separator 240, similar to the first and second separators, 144 and 168, respectively, shown in FIG. 19, but omitted in FIG. 20, is combined with the wetting station 228.

In operation of this type of arrangement, a wetting liquid is added in tank 230, and the pump 236 is turned on, so that wetting liquid 237 is taken from the tank 230, and forcefully delivered close to the bottom 238 of the hollow cylindrical body 232. This forms a stream of wetting liquid moving in a substantially upward direction and exiting through the top 234 to return to the tank 230. More wetting liquid 237 is passed over the low point 235 than over any other higher point of the inclined opening 234. This produces higher flow in the vicinity of the low point 235, so that a yolk allowed to drop into the upward moving stream, is carried along with the stream and passes over the opening 234 in the vicinity of the low point 235. As the yolk passes over the opening 234 it jumps onto the separator 240, where it is separated from the wetting liquid 237.

This type of wetting station, where the yolk falls into a stream of upward moving wetting liquid may be used for either first wetting liquid (122 containing a cross-linker, for example) or second wetting liquid (166 containing a cross-linkable polymer, for example) or both. Since, however, it works better with higher viscosity liquids, it is preferable that it is used with the second wetting liquid, which in this particular case has higher viscosity, and of course in combination with a separator.

Figure 21:
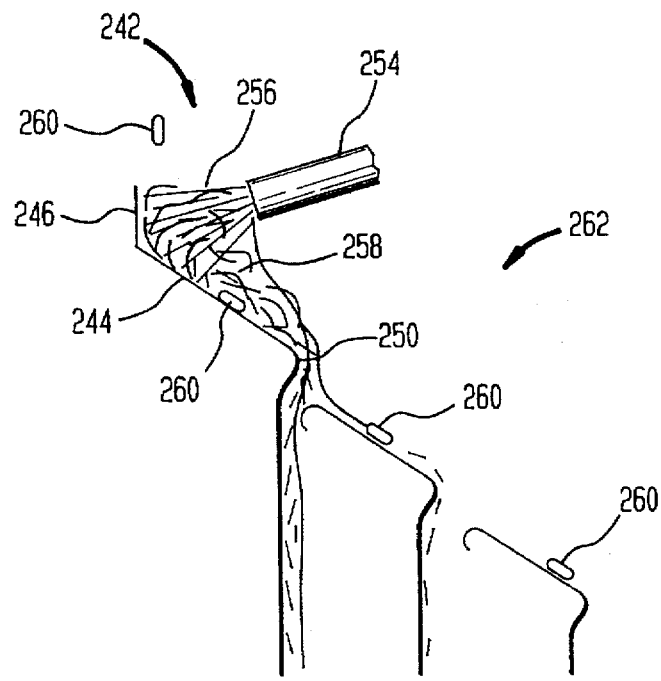
FIG. 21 illustrates a different type of a wetting station which produces a turbulent stream of wetting liquid, combined with a separator, according to the present invention.
Figure 22:
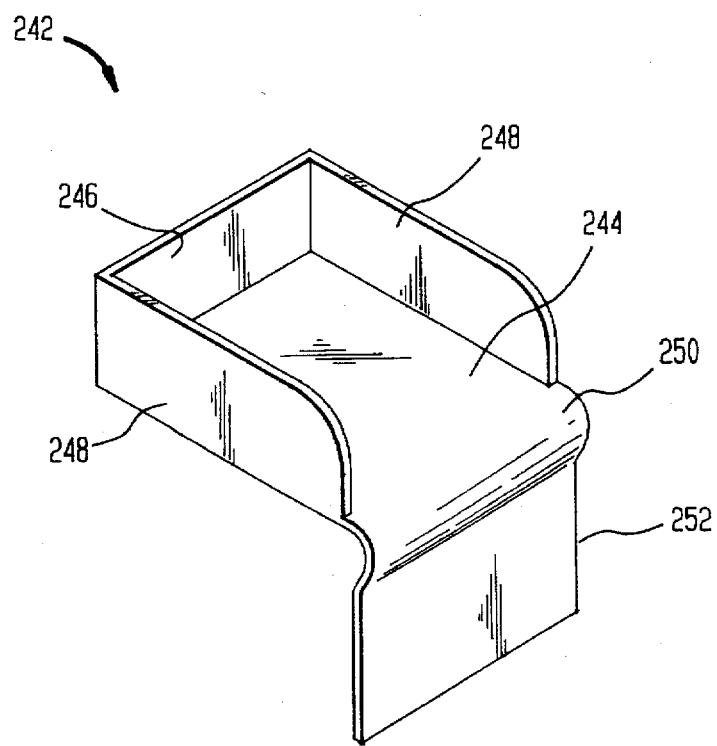
FIG. 22 is a perspective view of the wetting station of FIG. 21 according to the present invention.

A still different type of wetting station according to the present invention is shown in FIGS. 21 and 22. This is a turbulent flow wetting station 242, comprising an inclined portion 244 provided with a back wall 246, side walls 248, a curvature 250, and an anti-splash wall 252. On top of the inclined portion 244 there is a wetting liquid disposer 254, to provide wetting liquid 256, which when coming in contact with the inclined portion 44 and the walls 246 and 248, forms a turbulent stream 258 with an inclined flow direction. The wetting liquid 256 is preferably pumped from a tank by similar mechanisms and arrangements as discussed in the previous cases. The angle of inclination, or inclination, of the inclined portion 244 is preferably in the range of 30 to 70 degrees, more preferably in the range of 45 to 70 degrees, and even more preferably in the range of 50 to 60 degrees. If the angle is smaller than 30 degrees, the yolk or other article may not slide and stop on the inclined portion 244, while if the angle is larger than 70 degrees, an excessive amount of liquid may start taking the same direction as the initial direction of the yolk or other article leaving that plate, and in addition, the yolk or other article may start tumbling instead of sliding.

In operation of this wetting station, the wetting liquid is pumped through the dispenser 254, at such rate that it forms a turbulent stream 258 with an inclined flow direction when coming in contact with the inclined portion 244 and the walls 246 and 248 of the wetting station 242. Due to the turbulence and the inclination of the stream, a yolk disk 260, falling into the inclined stream 258, is excessively wetted by the wetting liquid 256, and it jumps to the separator 262 to be separated from the wetting liquid 256, as already described in detail in the previous cases.

This type of wetting station, where the yolk falls into a turbulent inclined stream of wetting liquid may be used for either first wetting liquid (122 containing a cross-linker, for example) or second wetting liquid (166 containing a cross-linkable polymer, for example) or both. Since, however, it works better with lower viscosity liquids, it is preferable that it is used with the first wetting liquid, which in this particular case has lower viscosity, and of course in combination with a separator.

Figure 23:
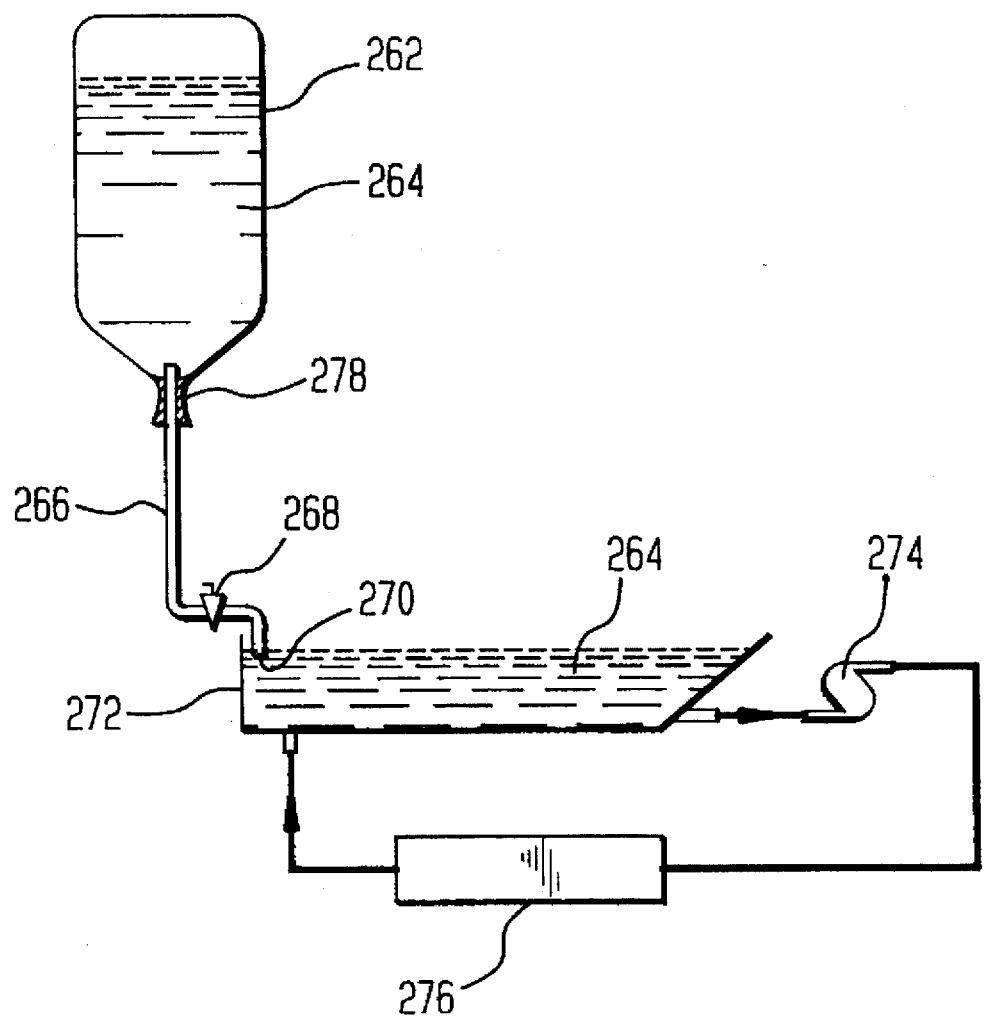
FIG. 23 illustrates a mechanism of replenishing consumed wetting liquids in the tanks of the coating station.

The wetting liquids of the miscellaneous tanks of the disk coating station, except for the rinsing tank in a number of occasions, have to be replenished as they are consumed during the encapsulation process. This could be accomplished by using level switches and a larger source of each particular wetting liquid. A good system requiring no level switch is illustrated in FIG. 23, wherein a jug 262 with a mouth 278, containing a particular wetting liquid 264 is connected to a tube 266 having a valve 268, close to an open end 270 of the tube 266. The open end 270 is positioned at a point determining the desired level of the wetting liquid 264 in the respective tank 272. The open end 270 is the only opening through which air can pass and enter the jug 264. The jug 262 is preferably jacketed and (not shown) so that its contents may be maintained preferably at a temperature lower than 60° F., and more preferably in the range of 35°–45° F., as described before regarding the miscellaneous tanks. In addition to the above, a pump 274 is adapted to recirculate the wetting liquid 264 contained in the tank 272, through a filter 276, and maintain the wetting liquid free of solid matter.

In operation of this arrangement, the jug 262 is filled with wetting liquid 264, the tube is installed in its mouth, which may simply closed with perforated rubber stopper, the valve 268 is turned in a closed position, and the jug is positioned in a desired position higher than the tank 272. The open end 270 of the tube 266 is then positioned at the desired level, and the valve 268 is turned in the on position. If the level of the liquid 264 in the tank 272 is lower than the position of the open end 270, air moves into the jug through the open end 270, and wetting liquid exits until the level of the liquid reaches and covers the open end. At this point, the atmospheric pressure does not allow more wetting liquid to exit from the jug 262, when the level of the wetting liquid drops under the open end 270, more air enters the jug, and wetting liquid exits the jug 262 until the open end is covered again. It is preferred that before positioning the open end 270 at the proper level, the rest of the operation is started, so that all the tubes and additional parts of the station are filled with wetting liquid, and a dynamic level of the wetting liquid in the tank 272 is reached.

After rinsing, the yolk disk enters the packaging station 18 (FIG. 1), which may be any conventional packaging station, well known to the art. The yolk disk and the corresponding amount of egg-white are packaged preferably in individual portions of one or two eggs per package, they are then frozen in the freezing station 20 and finally stored in a storage station of freezer 22 for storage and distribution. If the process takes place under aseptic conditions, the artificial eggs may be just refrigerated and stored under refrigeration.

Examples demonstrating the operation of the instant invention have been given for illustration purposes only, and should not be construed as limiting the scope of this invention in any way. In addition it should be stressed that the preferred embodiments discussed in detail hereinabove, as well as any other embodiments encompassed within the limits of the instant invention, may be practiced individually, or in any combination thereof, according to common sense and/or expert opinion. These combinations also lie within the realm of the present invention. Furthermore, any attempted explanations in the discussion are only speculative and are not intended to narrow the limits of this invention.

Composite numerals (containing a number part and a letter part) used in the different FIGS. represent the same or similar element performing the same or similar function, if the number part is the same.

What is claimed is:

1. An apparatus for encapsulating an article with a restrictive barrier comprising:

(a) a first liquid wetting station for contacting the article with an excess of a first liquid, the first liquid containing a first reactant;

(b) a first separator for separating the article from the excess of the first liquid;

(c) a second liquid wetting station for treating the wetted article with an excess of a second liquid containing a second reactant, which second reactant reacts with the first reactant to form the restrictive barrier; and (d) a second separator for separating the treated article from the second liquid;

wherein at least one of the first and second wetting stations is free of movement during operation, and free of mechanically moving parts.

2. An apparatus as defined in claim 1, wherein both the first and second separators are free of mechanically moving parts.

3. An apparatus as defined in claim 1, wherein at least one of the first and second separators further comprises at least one sliding plate, the sliding plate having a lower curvature and a direction, in a manner that said article, when disposed on the sliding plate, follows a first path away from the curvature in an initial direction substantially parallel to the direction of the sliding plate, while at least part of the first or second liquid, respectively, follows a second path at least partially coinciding with the curvature.

4. An apparatus as defined in claim 3, wherein the sliding plate of at least one of the first and the second separators has a first surface tension and an inclination, and the first or second liquid, respectively, has a second surface tension, the first surface tension being higher than the second surface tension, thereby causing the first or second liquid, respectively, to follow the second path, and wherein the inclination is adequately high to cause the article to follow the first path.

5. An apparatus as defined in claim 3, wherein at least one of the separators (b) and (d) further comprises a gas blower for blowing gas on the article.

6. An apparatus as defined in claim 3, wherein at least one of the first and second liquid wetting stations (a) and (c) comprises a liquid dispenser for providing the respective liquid at least partially in a form selected from a group consisting of (i) a stream moving in a substantially upward direction, (ii) a stream moving in a substantially horizontal direction, (iii) a turbulent stream with an inclined flow direction, and (iv) a liquid curtain.

7. An apparatus as defined in claim 3, wherein at least one of the first and second liquid wetting stations (a) and (c) further comprises a liquid curtain generator.

8. An apparatus as defined in claim 1, wherein:

the second wetting station comprises a liquid dispenser for providing the second liquid in a form of a stream moving in a substantially horizontal direction for wetting the article, and a liquid curtain generator positioned in a manner to wet any part of the article that might accidently escape wetting from the liquid stream; and the second separator comprises at least one sliding plate, the sliding plate having a lower curvature and a direction, in a manner that said article follows a first path away from the curvature in an initial direction substantially parallel to the direction of the sliding plate, while at least part of the second liquid follows a second path at least partially coinciding with the curvature.

9. An apparatus as defined in claim 8, wherein the second wetting station further comprises a second gas blower for blowing a gas on the article.

10. An apparatus as defined in claim 8, wherein the sliding plate has a first surface tension and an inclination, and the second liquid has a second surface tension, the first surface tension being higher than the second surface tension, thereby causing the liquid to follow the second path, and wherein the inclination is adequately high to cause the article to follow the first path.

11. An apparatus as defined in claim 8, further comprising:

(e) a rinsing station comprising a water dispenser for providing water at least partially in a form selected from a group consisting of (i) a stream moving in a substantially upward direction, (ii) a stream moving in a substantially horizontal direction, (iii) a turbulent stream with an inclined flow direction, for rinsing the article, and a water curtain generator positioned in a manner to rinse any part of the article that might accidently escape rinsing from the liquid stream; and (f) a water separator for separating the water from the article, the separator comprising a sliding plate, the sliding plate having a lower curvature and a direction, in a manner that said article follows a first path away from the curvature in an initial direction substantially parallel to the direction of the sliding plate, while at least part of the water follows a second path at least partially coinciding with the curvature.

* * * * *